(12) United States Patent
Hashida et al.

(10) Patent No.: US 12,167,128 B2
(45) Date of Patent: Dec. 10, 2024

(54) IMAGE PICKUP APPARATUS, ACCESSORY, CONTROL METHOD OF IMAGE PICKUP APPARATUS, CONTROL METHOD OF ACCESSORY, AND STORAGE MEDIUM

(71) Applicant: CANON KABUSHIKI KAISHA, Tokyo (JP)

(72) Inventors: Ryuki Hashida, Tokyo (JP); Yuki Tsujimoto, Tokyo (JP); Tsuyoshi Fujisaki, Tokyo (JP); Takayuki Hoshina, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 274 days.

(21) Appl. No.: 17/830,589

(22) Filed: Jun. 2, 2022

(65) Prior Publication Data
US 2022/0400212 A1    Dec. 15, 2022

(30) Foreign Application Priority Data

Jun. 9, 2021  (JP) .................. 2021-096340

(51) Int. Cl.
*H04N 23/65* (2023.01)
*H04N 23/663* (2023.01)
*H04N 23/667* (2023.01)

(52) U.S. Cl.
CPC ........ *H04N 23/651* (2023.01); *H04N 23/663* (2023.01); *H04N 23/667* (2023.01)

(58) Field of Classification Search
None
See application file for complete search history.

(56) References Cited

U.S. PATENT DOCUMENTS

| 11,323,606 B2* | 5/2022 | Hasegawa | H04N 23/661 |
| 2011/0063462 A1* | 3/2011 | Koike | H04N 23/661 348/E5.042 |
| 2012/0320256 A1* | 12/2012 | Ishibashi | H04N 23/69 348/347 |
| 2014/0354870 A1* | 12/2014 | Horie | G06F 1/3206 345/522 |
| 2016/0100105 A1* | 4/2016 | Saito | H04N 23/651 348/360 |
| 2016/0195916 A1* | 7/2016 | Shiozaki | G06F 1/1637 345/173 |
| 2019/0306392 A1* | 10/2019 | Imamura | H04N 23/65 |

FOREIGN PATENT DOCUMENTS

| JP | 5310906 B2 * | 10/2013 | ............ G03B 15/05 |
| JP | 2018-125296 A | 8/2018 | |

OTHER PUBLICATIONS

JP-5310906-B2; "Accessories And Cameras"; Sep. 10, 2013; English Translation (Year: 2013).*

* cited by examiner

*Primary Examiner* — Cynthia Segura
(74) *Attorney, Agent, or Firm* — Cowan, Liebowitz & Latman, P.C.

(57) ABSTRACT

An image pickup apparatus to which an accessory is attachable includes a control unit communicable with the accessory, and configured to store information on power suppliable to the accessory and to acquire from the accessory at least one of information on the power required by the accessory, information on a power source for the accessory, and information on charge control of a battery provided in the accessory.

22 Claims, 24 Drawing Sheets

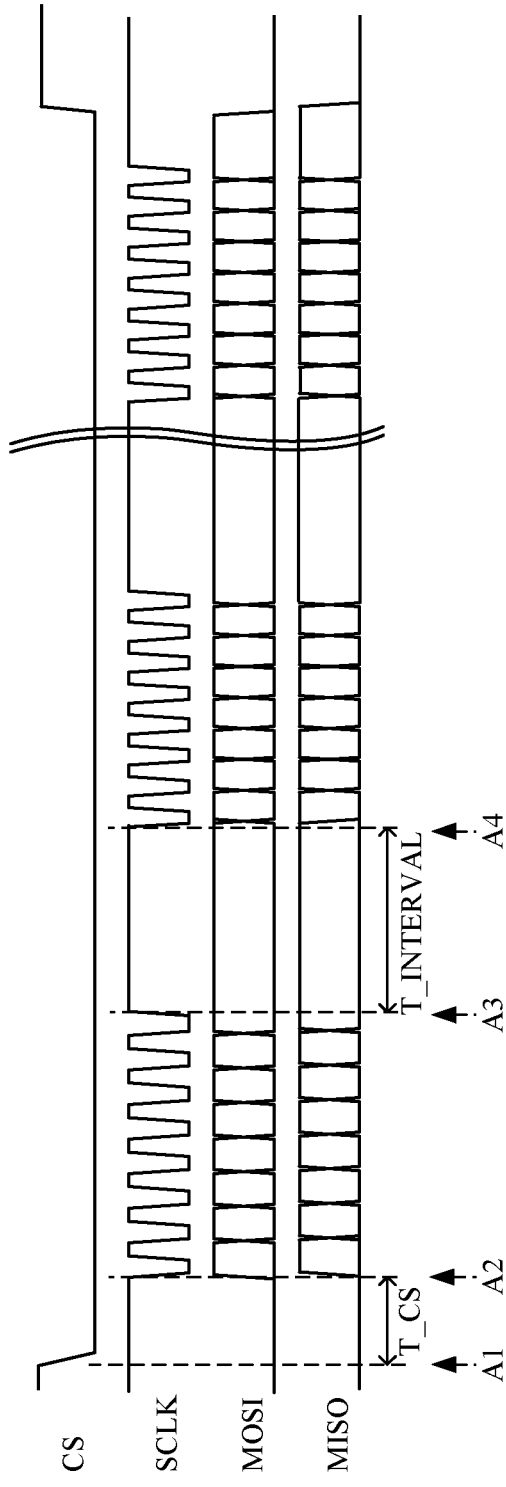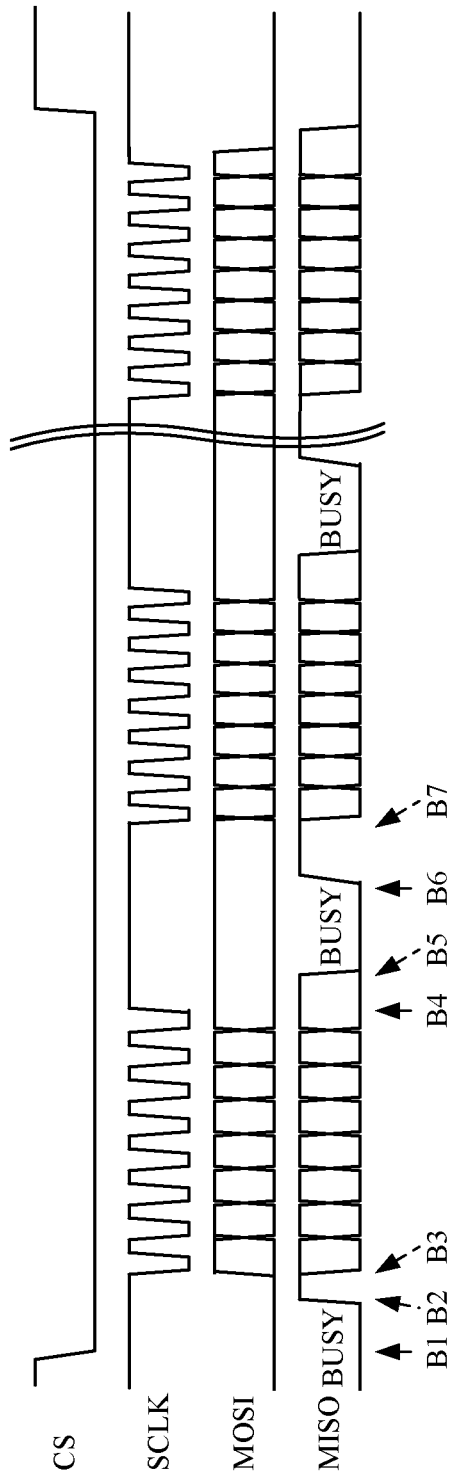

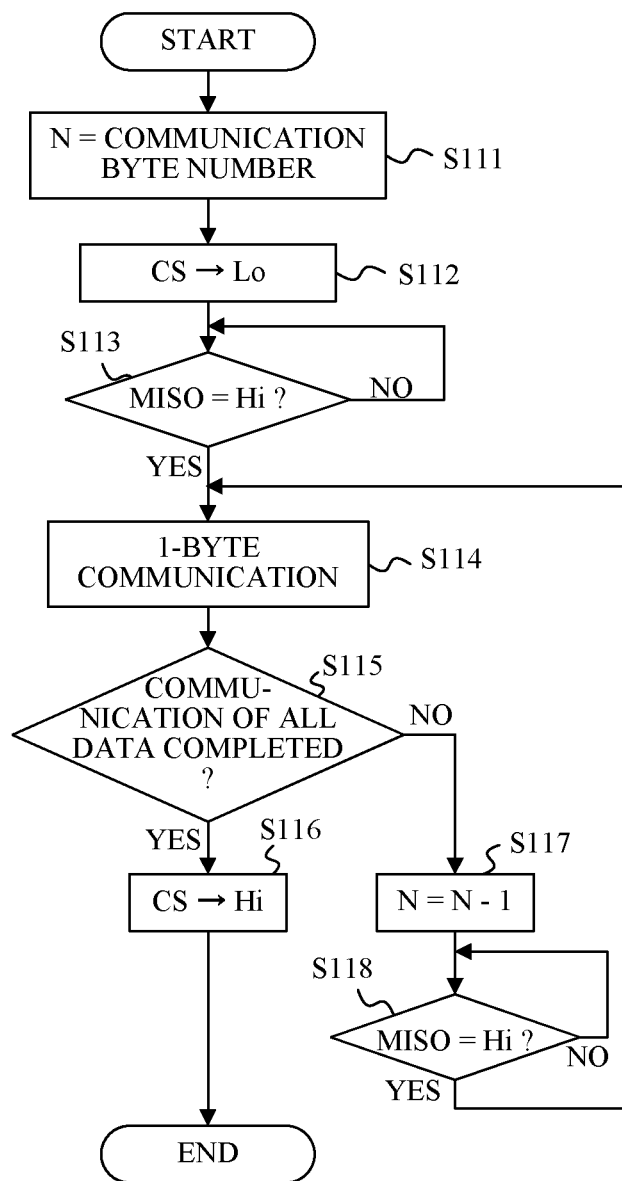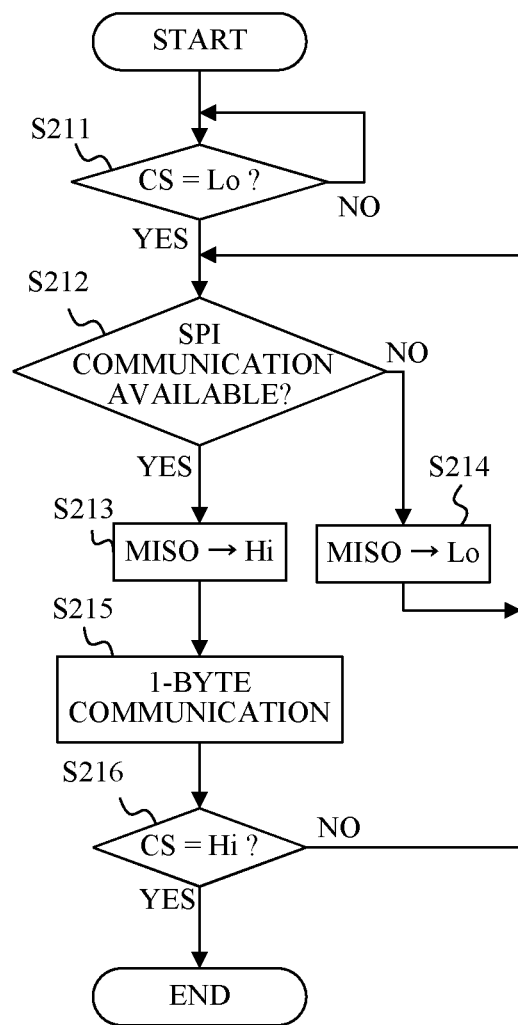
FIG. 2E
FIG. 2F

| | 1ST BYTE | 2ND BYTE | 3RD BYTE | ... | (N-2)TH BYTE | (N-1)TH BYTE | NTH BYTE |
|---|---|---|---|---|---|---|---|
| MOSI DATA | CMD | MOSI_DATA1 | MOSI_DATA2 | ... | MOSI_DATA[N-3] | CheckSum_C | 0x00 |
| MISO DATA | 0xA5 | CMD | MISO_DATA1 | ... | MISO_DATA[N-4] | 0x00 | CheckSum_A |

FIG. 3

| ADDRESS | D7 | D6 | D5 | D4 | D3 | D2 | D1 | D0 |
|---|---|---|---|---|---|---|---|---|
| 0x00 | ACC TYPE ||||||||
| 0x01 | ACC ID NO. ||||||||
| 0x02 | FIRMWARE VER. ||||||||
| 0x03 | POWER SUPPLY DURING POWER-OFF || POWER SUPPLY DURING AUTOMATIC POWER-OFF || POWER SUPPLY SPECIFICATION || CHARGEABILITY ||
| 0x04 | REQUEST POWER ||||||||
| 0x05 | FIRMWARE UPDATE MODE | FIRMWARE UPDATE FUNCTION | INTERMEDIATE ACCESSORY OPERATION PERMISSION | INTERMEDIATE ACCESSORY CONFIRMATION AT START ||| I2C COMMAND COMMUNICATION AVAILABILITY ||
| 0x06 | RESERVE ||| COMMUNICATION REQUEST FACTOR ACQUIRING METHOD | FUNCTIONAL SIGNAL 4 | FUNCTIONAL SIGNAL 3 | FUNCTIONAL SIGNAL 2 | FUNCTIONAL SIGNAL 1 |
| 0x07 | RESERVE ||||||||
| 0x08 | RESERVE ||||||||
| 0x09 | RESERVE ||||||||
| 0x0A | SILENT START | COMMUNICATION REQUEST FACTOR |||||||
| 0x0B | RESERVE ||||||||
| 0x0C | RESERVE |||||| SPI PROTOCOL | CS LOGIC |
| 0x0D | COMMUNICATION INTERVAL BETWEEN SPI BYTES ||||||||
| 0x0E | COMMUNICATION INTERVAL BETWEEN SPI BYTES (IN FIRMWARE UPDATE MODE) ||||||||
| 0x0F | CHECKSUM ||||||||

FIG. 4

| NO. | TYPE |
|---|---|
| 0x00 | RESERVE |
| 0x01 | RESERVE |
| : | : |
| 0x80 | RESERVE |
| 0x81 | STROBE |
| 0x82 | INTERFACE CONVERSION ADAPTER |
| 0x83 | MICROPHONE |
| 0x84 | MULTI-ACCESSORY CONNECTION ADAPTER |
| 0x85 | RESERVE |
| 0x86 | RESERVE |
| 0x87 | RESERVE |
| 0x88 | RESERVE |
| 0x89 | RESERVE |
| 0x90 | RESERVE |
| : | : |
| 0xFF | RESERVE |

FIG. 6

| FACTOR NO. | FACTOR CONTENT |
|---|---|
| 0x00 | PRESS OF MENU CALL SW |
| 0x01 | VOICE STABILIZATION COMPLETION |
| 0x02 | VOICE UNMUTE |
| 0x03 | |
| 0x04 | |
| 0x05 | |
| 0x06 | |
| 0x07 | |
| : | |
| 0x79 | |
| 0x7A | |
| 0x7B | |
| 0x7C | |
| 0x7D | |
| 0x7E | |
| 0x7F | |

FIG. 7

| | COMMUNICATION INTERVAL |
|---|---|
| 0 | 1us |
| 1 | 2us |
| 2 | 5us |
| 3 | 10us |
| 4 | 15us |
| 5 | 25us |
| 6 | 50us |
| 7 | 100us |

FIG. 8A

| | COMMUNICATION INTERVAL |
|---|---|
| 0 | 1ms |
| 1 | 2ms |
| 2 | 5ms |
| 3 | 10ms |
| 4 | 20ms |
| 5 | 50ms |
| 6 | 80ms |
| 7 | 100ms |

FIG. 8B

IMAGE PICKUP APPARATUS, ACCESSORY, CONTROL METHOD OF IMAGE PICKUP APPARATUS, CONTROL METHOD OF ACCESSORY, AND STORAGE MEDIUM

BACKGROUND OF THE INVENTION

Field of the Invention

The present invention relates to an image pickup apparatus and an accessory.

Description of the Related Art

An accessory that has no built-in battery is known as an accessory that is attachable to an image pickup apparatus. Such an accessory can be operated by power supplied from the image pickup apparatus and be made compact, and the user does not need to carry a spare battery for the accessory. On the other hand, a built-in battery in the image pickup apparatus is used as a power source for the accessory, and thus the battery life of the image pickup apparatus becomes shorter. The power necessary for the accessory varies for each accessory or for each image pickup apparatus. The power suppliable from the image pickup apparatus to the accessory is different according to an operation state (operation mode) of the image pickup apparatus.

Japanese Patent No. 5310906 discloses a method for an image pickup apparatus to determine whether to supply power to an accessory based on first information stored in the accessory, which causes the image pickup apparatus to determine whether or not the accessory requests the image pickup apparatus for power supply. Japanese Patent Laid-Open No. 2018-125296 discloses a method of changing a characteristic of a second power supply based on information acquired while no second power supply is performed wherein power is suppliable through a first power supply line and a second power supply line.

The methods disclosed in Japanese Patent No. 5310906 and Japanese Patent Laid-Open No. 2018-125296 determine whether or not the image pickup apparatus supplies power based only on information on the accessory. However, the power necessary for the accessory varies for each accessory or for each image pickup apparatus. The power suppliable to the accessory varies according to the operation mode of the image pickup apparatus. Therefore, accessory information alone is insufficient to achieve efficient power consumption.

SUMMARY OF THE INVENTION

The present invention provides an image pickup apparatus, an accessory, a control method for the image pickup apparatus, a control method for the accessory, and a storage medium, each of which can provide efficient power consumption.

An image pickup apparatus according to one aspect of the present invention to which an accessory is attachable includes at least one processor, and at least one memory coupled to the at least one processor storing instructions that, when executed by the at least one processor, cause the at least one processor to function as a control unit communicable with the accessory. The control unit stores information on power suppliable to the accessory, and acquires from the accessory at least one of information on the power required by the accessory, information on a power source for the accessory, and information on charge control of a battery provided in the accessory.

An image pickup apparatus according to another aspect of the present invention to which an accessory is attachable includes a power supply unit configured to supply a first power and a second power larger than the first power to the accessory, and at least one processor, and at least one memory coupled to the at least one processor storing instructions that, when executed by the at least one processor, cause the at least one processor to function as a control unit configured to store information on power suppliable to the accessory and to control the power supply unit and to control the power supplied from the power supply unit to the accessory based on the information on the power suppliable to the accessory and information on the power required by the accessory acquired from the accessory.

An accessory according to another aspect of the present invention attachable to an image pickup apparatus includes at least one processor, and at least one memory coupled to the at least one processor storing instructions that, when executed by the at least one processor, cause the at least one processor to function as a control unit communicable with the image pickup apparatus, is supplied with power from the image pickup apparatus, and transmits type information on the accessory in accordance with a request from the image pickup apparatus. The control unit transmits to the image pickup apparatus at least one of information on the power required by the accessory, information on a power source for the accessory, and information on charge control of a battery in the accessory.

A control method of an image pickup apparatus and a control method of an accessory corresponding to the above image pickup apparatus and the accessory also constitute another aspect of the present invention. A non-transitory computer-readable storage medium storing a program that causes a computer to execute each of the above control methods also constitutes another aspect of the present invention.

Further features of the present invention will become apparent from the following description of exemplary embodiments with reference to the attached drawings.

BRIEF DESCRIPTION OF THE DRAWINGS

FIG. 2A is a schematic diagram of a communication waveform of SPI protocol A according to the first embodiment.

FIG. 2B is a schematic diagram of a communication waveform of SPI protocol B according to the first embodiment.

FIG. 2E is a flowchart illustrating an operation of the camera control circuit B in the SPI protocol B according to the first embodiment.

FIG. 2F is a flowchart illustrating an operation of the accessory control circuit in the SPI protocol B according to the first embodiment.

FIG. 3 is an explanatory diagram of SPI communication contents according to the first embodiment.

FIG. 4 is an explanatory diagram of accessory information according to the first embodiment.

FIG. 6 is an explanatory diagram of accessory type information according to the first embodiment.

FIG. 7 is an explanatory diagram of a factor number and a factor content of a communication request according to the first embodiment.

FIGS. 8A and 8B are explanatory diagrams of communication data interval information in SPI communication according to the first embodiment.

DESCRIPTION OF THE EMBODIMENTS

Referring now to the accompanying drawings, a detailed description will be given of embodiments according to the present invention.

First Embodiment

Figure 1:
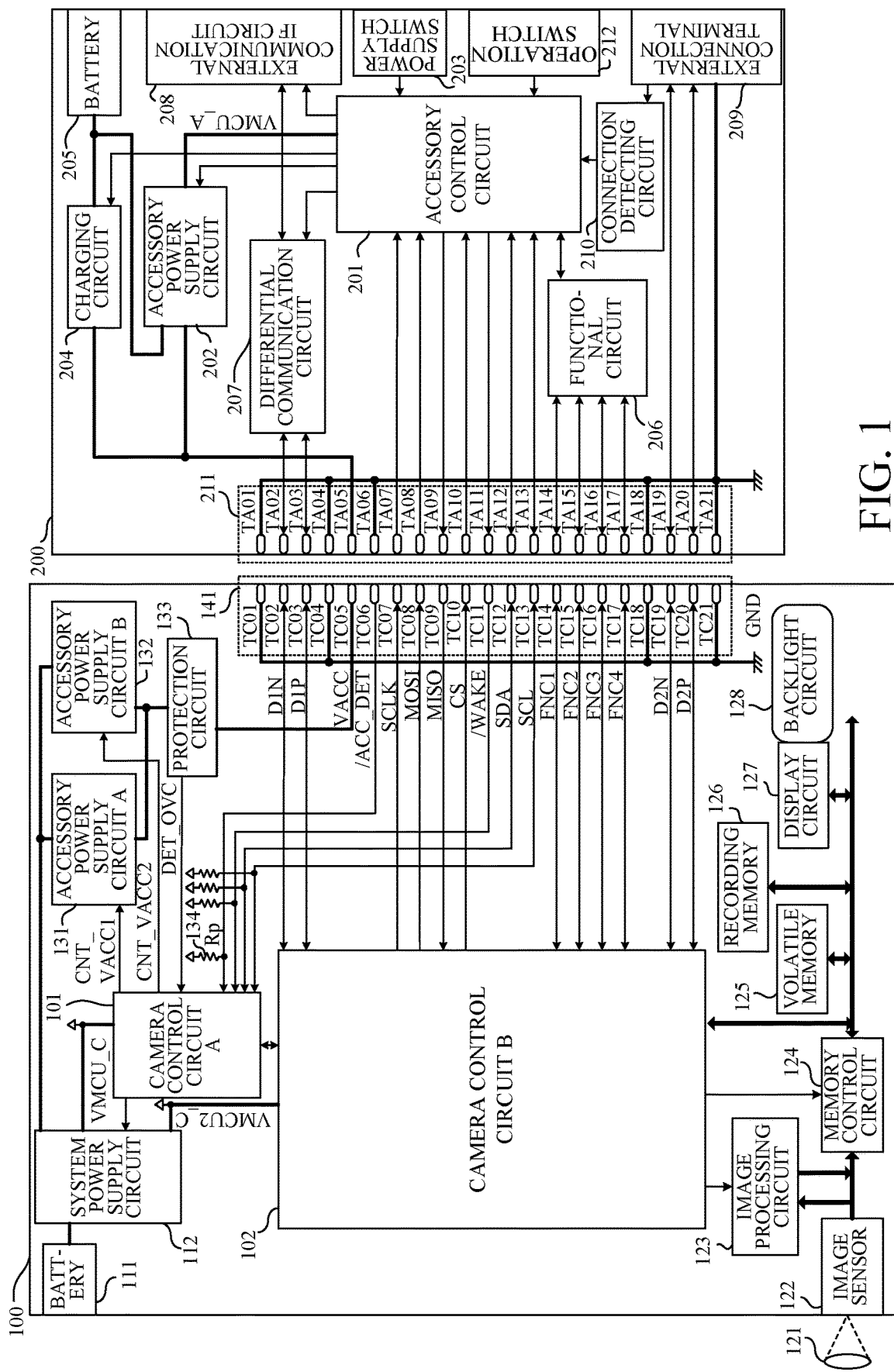
FIG. 1 is a configuration diagram of a camera system according to a first embodiment.

Referring now to FIG. 1, a description will be given of a camera system (image pickup system) 10 according to a first embodiment. FIG. 1 is a configuration diagram of the camera system 10. The camera system 10 includes a camera (image pickup apparatus) 100 as an electronic apparatus and an accessory 200 detachably attached to the camera 100. The camera 100 and the accessory 200 are electrically connected via one-to-one contacts between a plurality of contacts (terminals) TC01 to TC21 of a camera connector 141 of the camera 100 and a plurality of contacts TA01 to TA21 of an accessory connector 211 of the accessory 200, respectively.

The camera 100 is supplied with power from a battery 111. The battery 111 is attachable to and detachable from the camera 100. A camera control circuit A 101 (first control unit) and a camera control circuit B 102 (second control unit) as control units of the camera 100 are circuits that control the entire camera 100, and include a processor (microcomputer) that includes a CPU etc. The camera control circuit A101 monitors a switch or the like for unillustrated camera operations. The camera control circuit A101 operates even when the camera 100 is in the standby state (low power consumption mode), and controls a system power supply and the like in accordance with an operation of the user. The camera control circuit B 102 is responsible for controlling an image sensor 122, a display circuit (display unit) 127, and the like, and the camera 100 is stopped when the camera 100 is in the standby state (low power consumption mode).

A system power supply circuit 112 is a circuit that generates power to be supplied to each circuit in the camera 100, and includes a DC/DC converter circuit, Low Drop Out (LDO), a charge pump circuit, and the like. A voltage of 1.8 V that is generated by the system power supply circuit 112 that receives power from the battery 111 is constantly supplied as camera microcomputer power supply VMCU_C to the camera control circuit A 101. Several types of voltages that are generated by the system power supply circuit 112 are supplied as camera microcomputer power supply VMCU2_C to the camera control circuit B 102 at an arbitrary timing. The camera control circuit A 101 controls turning on and off of the power supply to each circuit in the camera 100 by controlling the system power supply circuit 112.

An optical lens (lens apparatus) 121 is attachable to and detachable from the camera 100. Light from an object incident through the optical lens 121 is imaged on the image sensor 122, such as a CMOS sensor and a CCD sensor. The optical lens 121 and the camera 100 may be integrated. An object image formed on the image sensor 122 is encoded into a digital imaging signal. An image processing circuit 123 performs image processing such as noise reduction processing and white balance processing for the digital imaging signal to generate image data, and converts the image data into an image file in a JPEG format or the like in order to record the image data in a recording memory 126. The image processing circuit 123 generates from the image data VRAM image data to be displayed on the display circuit 127. A conversion into another voltage may be used.

A memory control circuit 124 controls transmissions and receptions of image data and other data generated by the image processing circuit 123 and the like. A volatile memory 125 is a memory capable of high-speed reading and writing such as DDR3SDRAM, and is used as a workspace for image processing that is performed by the image processing circuit 123. The recording memory 126 is a readable and writable recording medium such as an SD card or a CFexpress card that is attachable to and detachable from the camera 100 via an unillustrated connector. The display circuit 127 is a display disposed on a back surface of the camera 100, and includes an LCD panel, an organic EL display panel, and the like. A backlight circuit 128 adjusts the brightness of the display circuit 127 by changing the light amount of the backlight of the display circuit 127.

Each of a power supply circuit A for the accessory (accessory power supply circuit A hereinafter) 131 and a power supply circuit B for the accessory (accessory power supply circuit B hereinafter) 132 serves as a power supply unit, is a voltage conversion circuit that converts voltage supplied from the system power supply circuit 112 into predetermined voltage, and generates 3.3 V as accessory power supply VACC in this embodiment. The accessory power supply circuit A 131 is a power supply circuit that includes LDO or the like and has a low self-power consumption. The accessory power supply circuit B 132 includes a DC/DC converter circuit or the like, and can pass current larger than that of the accessory power supply circuit A 131. The consumed power (second power) of the accessory power supply circuit B 132 is larger than the consumed power (first power) of the accessory power supply circuit A 131. Therefore, when a load current is small, the accessory power supply circuit A 131 is more efficient than the accessory power supply circuit B 132, and when the load current is large, the accessory power supply circuit B 132 is more efficient than the accessory power supply circuit A 131. The camera control circuit A 101 controls turning on and off of voltage outputs of the accessory power supply circuits A 131 and B 132 according to the operation state of the accessory 200.

A protection circuit 133 as a projection unit includes a current fuse element, an electronic fuse circuit in which a poly-switch element or a resistor, an amplifier, and a switching element are combined, or the like. The protection circuit 133 outputs overcurrent detecting signal DET_OVC when power supply current values supplied to the accessory 200 from the accessory power supply circuits A 131 and B 132 are higher than a predetermined value and become excessive (abnormal). In this embodiment, the protection circuit 133 is the electronic fuse circuit, and notifies the camera control circuit A101 of the overcurrent detecting signal DET_OVC when a current of 1 A or more flows. The overcurrent detecting signal DET_OVC indicates the overcurrent by becoming at a high level. The predetermined value may be different from 1 A.

The camera connector 141 is a connector for an electrical connection with the accessory 200 via 21 contacts TC01 to TC21 that are arranged in a row. The contacts TC01 to TC21 are arranged in this order from one end to the other end in this arrangement direction.

The contact TC01 is connected to the ground (GND) and serves not only as a reference potential contact but also as a contact for controlling wiring impedances of the differential signals D1N and D1P. The contact TC01 corresponds to a third ground contact. The differential signal D1N that is connected to the contact TC02 and the differential signal D1P that is connected to the contact TC03 are differential data communication signals that perform data communications in pairs, and are connected to the camera control circuit B 102. The contacts TC02, TC03, TC07 to TC17 described below, TC19 and TC20 are communication contacts.

The contact TC04 as a first ground contact is connected to GND and serves as a reference potential contact for the camera 100 and the accessory 200. The contact TC04 is disposed outside the contact TC05 described below in the contact arrangement direction. The accessory power supply VACC generated by the accessory power supply circuits A 131 and B 132 is connected to the contact TC05 as a power supply contact via the protection circuit 133.

An accessory attachment detecting signal /ACC_DET is connected to the contact TC06 as an attachment detecting contact. The accessory attachment detecting signal /ACC_DET is pulled up to the camera microcomputer power supply VMCU_C via a resistor element Rp 134 (10 kΩ). The camera control circuit A 101 can detect whether or not the accessory 200 is attached by reading a signal level of the accessory attachment detecting signal /ACC_DET. If the signal level (potential) of the accessory attachment detecting signal /ACC_DET is high (predetermined potential), it is detected that the accessory 200 is not attached, and if it is a low level (GND potential as described below), it is detected that the accessory 200 is attached.

Changing the signal level (potential) of the accessory attachment detecting signal /ACC_DET from the high level (Hi) to the low level (Lo) when the camera 100 is powered on triggers various transmissions between the camera 100 and the accessory 200 via contacts.

The camera control circuit 101 supplies power to the accessory 200 via TC05 as the power supply contact in response to detecting the attachment of the accessory 200.

SCLK connected to the communication contact TC07, MOSI connected to a contact TC08, MISO connected to the contact TC09, and Chip Select (CS) connected to the contact TC10 are signals for Serial Peripheral Interface (SPI) communication in which the camera control circuit B 102 becomes a communication master. In this embodiment, the SPI communication has a communication clock frequency of 1 MHz, a data length of 8 bits (1 byte), and a bit order of MSB first, and a full-duplex communication method.

In this embodiment, the camera 100 and the accessory 200 can support two types of communication protocols (control methods) for the SPI communication method. The first communication protocol (first control method) is a method that does not confirm whether the accessory 200 is in a communicable state (communicability state of the accessory 200 or whether or not the accessory 200 is communicable) before the camera 100 outputs SCLK, and will be referred to as SPI protocol Ain this embodiment. FIG. 2A is a schematic diagram of a communication waveform of the SPI protocol A. In FIG. 2A, a CS signal is low-active.

The camera control circuit B 102 changes CS into a low level at timing A1 and requests the accessory control circuit (control unit) 201 for the SPI communication. At timing A2 predetermined time T_CS after the timing A1, the camera control circuit B 102 starts outputting SCLK and MOSI. Similarly, when the accessory control circuit 201 detects a trailing edge of SCLK, the accessory control circuit 201 starts outputting MISO. The camera control circuit B 102 stops outputting SCLK at timing A3 when completing outputting 1-byte SCLK. The camera control circuit B 102 stops outputting SCLK at the timing A3 for predetermined time T_INTERVAL, resumes the output of SCLK at timing A4 after the T_INTERVAL has elapsed, and performs the next 1-byte communication.

Figure 2C:
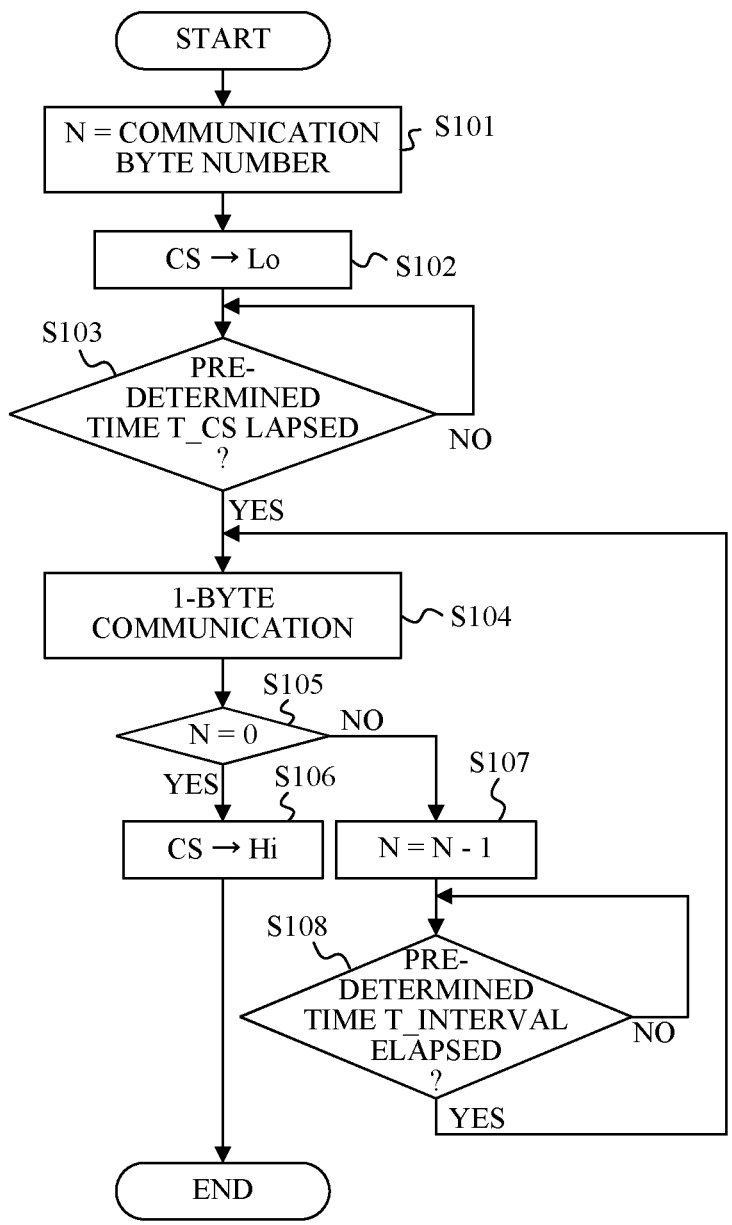
FIG. 2C is a flowchart illustrating an operation of a camera control circuit B in the SPI protocol A according to the first embodiment.

FIG. 2C is a flowchart illustrating an operation of the camera control circuit B102 in the SPI protocol A. In step S101, the camera control circuit B 102 stores a numerical value indicating the number of bytes to be communicated in internal variable N. For example, 3 is stored in a case of 3-byte communication. Next, in step S102, the camera control circuit B 102 changes CS to a low level and requests for SPI communication. In step S103, the camera control circuit B 102 performs wait processing until predetermined time T_CS elapses after CS is changed to the low level. After the predetermined time T_CS elapses, the flow proceeds to step S104.

In step S104, the camera control circuit B 102 controls an SCLK output, a MOSI data output, and a MISO data input and performs 1-byte data communication. Next, in step S105, the camera control circuit B102 determines whether the internal variable N indicating the number of communication bytes is 0. In the case where the internal variable N is 0, the flow proceeds to step S106. On the other hand, in the case where the internal variable N is other than 0, the flow proceeds to step S107.

In step S107, the camera control circuit B 102 stores as new internal variable N a value obtained by decrementing the numerical value of the internal variable N indicating the number of communication bytes by 1. Next, in step S108, the camera control circuit B 102 performs wait processing until the predetermined time T_INTERVAL elapses after the 1-byte data communication in step S104 is completed. Then, after the predetermined time T_INTERVAL elapses, the flow returns to the processing in step S104, and the camera control circuit B 102 executes the same processing again. In step S106, the camera control circuit B 102 changes CS to a high level and ends a series of SPI communication.

Figure 2D:
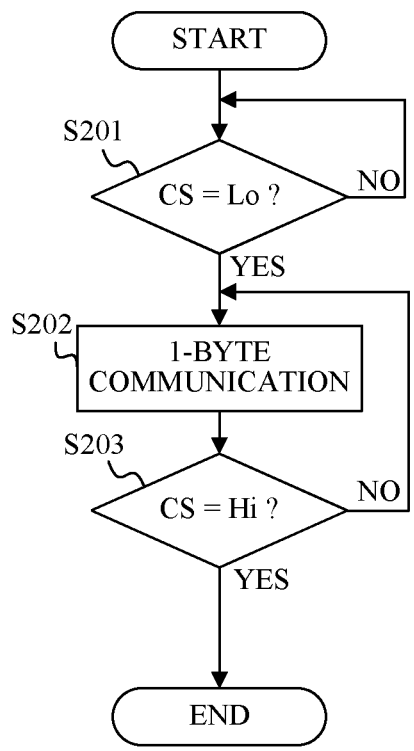
FIG. 2D is a flowchart illustrating an operation of an accessory control circuit in the SPI protocol A according to the first embodiment.

FIG. 2D illustrates an operation of the accessory control circuit 201 in the SPI protocol A. In step S201, the accessory control circuit 201 determines whether or not CS has changed to a low level. In the case where CS has changed to the low level, the flow proceeds to step S202, and in the case where CS has not changed to the low level, the flow returns to step S211.

In step S202, the accessory control circuit 201 performs the 1-byte data communication by the MOSI data input control and MISO data output control in response to the SCLK signal input. Next, in step S203, the accessory control circuit 201 determines whether or not CS has changed to a high level. In the case where the CS has changed to the high level, the accessory control circuit 201 determines that the SPI communication has been completed. In the case where the CS has not changed to the high level, the flow returns to step S202 so that the accessory control circuit 201 performs the next 1-byte communication.

The second communication protocol (second control method) is a method of confirming whether the accessory 200 is in a communicable state (communicability state of the accessory 200) before the camera 100 outputs SCLK and will be referred to as SPI protocol B in this embodiment. FIG. 2B is a schematic diagram of a communication waveform of the SPI protocol B. At timing B1, the camera control circuit B102 changes CS to a low level and requests the accessory control circuit 201 for SPI communication. The camera control circuit B102 confirms the potential of MISO together with the communication request. When the potential of MISO is a high level, the camera control circuit B102 determines that the accessory control circuit 201 is in a communicable state. On the other hand, when the potential of MISO is a low level, the camera control circuit B102 determines that the accessory control circuit 201 is in an incommunicable state.

On the other hand, when the accessory control circuit 201 detects a trailing edge of CS, the accessory control circuit 201 performs control for changing MISO to a high level if the SPI communication is available, and performs control for changing MISO to a low level if the communication is unavailable (B2).

When the camera control circuit B 102 confirms that MISO is at a high level at timing B3, the camera control circuit B 102 starts outputting SCLK and MOSI. The accessory control circuit 201 starts outputting MISO when detecting a trailing edge of SCLK. The camera control circuit B 102 stops outputting SCLK when the 1-byte SCLK output is completed at timing B4.

After the 1-byte communication, the accessory control circuit 201 performs control for changing MISO to a high level if the SPI communication is available, and control for changing MISO to a low level if the SPI communication is unavailable (B5, B6). The camera control circuit B 102 confirms the potential of MISO at timing B7. If MISO is at a high level, it is determined that the accessory control circuit 201 is in a communicable state, and if MISO is at a low level, it is determined that the accessory control circuit 201 is in an incommunicable state.

FIG. 2E is a flowchart illustrating processing of the camera control circuit B 102 in the SPI protocol B. In step S111, the camera control circuit B 102 stores a numerical value indicating the number of bytes to be communicated in the internal variable N. For example, 3 is stored in the case of 3-byte communication. Next, in step S112, the camera control circuit B 102 changes CS to a low level and requests SPI communication. Next, in step S113, the camera control circuit B 102 determines whether MISO has changed to a high level. In the case where MISO is at the high level, the flow proceeds to step S114, and in the case where MISO has not yet at the high level, the flow returns to step S113.

In step S114, the camera control circuit B 102 controls an SCLK output, a MOSI data output, and a MISO data input so as to perform 1-byte data communication. Next, in step S115, the camera control circuit B 102 determines whether or not the internal variable N indicating the number of communication bytes is 0. In the case where the internal variable N is 0, the flow proceeds to step S116, and in the case where the internal variable N is other than 0, the flow proceeds to step S117.

In step S117, the camera control circuit B 102 stores as new internal variable N a value obtained by decrementing the numerical value of the internal variable N indicating the number of communication bytes by 1. Next, in step S118, the camera control circuit B 102 determines whether or not MISO has changed to a high level. In the case where MISO is at the high level, the flow proceeds to step S114, and in the case where MISO has not yet been at the high level, the flow returns to step S118. In step S116, the camera control circuit B 102 changes CS to a high level and ends a series of SPI communications.

FIG. 2F is a flowchart illustrating an operation of the accessory control circuit 201 in the SPI protocol B. In step S211, the accessory control circuit 201 determines whether or not CS has changed to a low level. In the case where CS has changed to the low level, the flow proceeds to step S212, and in the case where CS has not yet changed to the low level, the flow returns to step S211.

In step S212, the accessory control circuit 201 determines whether or not the SPI communication is available. In the case where the SPI communication is available, the flow proceeds to step S213, and in the case where the SPI communication is unavailable, the flow proceeds to step S214. In step S213, the accessory control circuit 201 performs control for changing MISO to a high level and the flow proceeds to step S215. In step S214, the accessory control circuit 201 performs control for changing MISO to a low level and the flow returns to step S212.

In step S215, the accessory control circuit 201 controls a MOSI data input and a MISO data output in response to the SCLK signal input and performs 1-byte data communication. Next, in step S216, the accessory control circuit 201 determines whether or not CS has changed to a high level. In the case where CS has changed to the high level, it is determined that the SPI communication has been completed, and in the case where CS has not changed to the high level, the flow returns to step S212 so as to perform the next 1-byte communication.

FIG. 3 explains communication contents in notifying an operation execution instruction (command) from the camera 100 to the accessory 200 by the SPI communication in this embodiment. The camera control circuit B 102 transmits as MOSI data information CMD indicating a command number to the accessory control circuit 201 in the first-byte communication. The accessory control circuit 201 transmits as MISO data a value of 0xA5, which is information indicating the communicable state. In the case where the first-byte communication processing cannot be executed, the accessory control circuit 201 transmits as MISO data a value other than 0xA5.

The camera control circuit B 102 transmits argument MOSI_DATA1 corresponding to the command number CMD in the second-byte communication. From the third byte to the (N−2)th byte, the camera control circuit B 102 similarly transmits the arguments MOSI_DATA2 to MOSI_DATA [N−3] corresponding to the command number CMD.

The accessory control circuit 201 transmits as MISO data the command number CMD received in the first byte to the camera control circuit B 102 in the second-byte communication. This configuration enables the camera control circuit B 102 to determine that the accessory control circuit 201 has correctly received the MOSI data.

The accessory control circuit 201 transmits, as MISO data, return value MISO_DATA1 corresponding to the command number CMD in the third-byte communication. From the fourth byte to the (N−2)th byte, the accessory control circuit 201 similarly transmits arguments MISO_DATA2 to MISO_DATA [N−4] corresponding to the command number CMD. Assume that the number of arguments and the number of return values are previously determined for each command number. One or both of the argument and the return value may be omitted.

The camera control circuit B 102 transmits checksum data CheckSum_C as MOSI data to the accessory control circuit 201 in the (N−1)th byte communication. The checksum data CheckSum_C is a value calculated by the following expression (1).

$$\text{CheckSum\_C}=\text{EXOR}(\text{AND}(\text{SUM}(\text{CMD}, \text{MOSI\_DATA1},\ldots,\text{MOSI\_DATA}[N-3]), 0x\textit{FF}),0x\textit{FF}) \quad (1)$$

The accessory control circuit 201 transmits 0x00 as MISO data.

The camera control circuit B 102 transmits 0x00 as MOSI data in the Nth-byte communication. The accessory control circuit 201 transmits checksum data CheckSum_A as MISO data. The checksum data CheckSum_A is calculated by the following expression (2) or (3).

In the case where the value of CheckSum_C received by the camera control circuit B 102 in the (N−1)th-byte communication and the value of CheckSum_C calculated by the camera control circuit B 102 accord with each other, CheckSum_A is calculated by the expression (2).

$$\text{CheckSum\_A}=\text{EXOR}(\text{AND}(\text{SUM}(0x\textit{A}5,\text{CMD}, \text{MISO\_DATA1},\ldots,\text{MOSI\_DATA}[N-4]), 0x\textit{FF}),0x\textit{FF}) \quad (2)$$

In the case where the value of CheckSum_C received by the camera control circuit B 102 in the (N−1)th-byte communication and the value of CheckSum_C calculated by the camera control circuit B 102 do not accord with each other, CheckSum_A is calculated by the expression (3).

$$\text{CheckSum\_A}=\text{AND}(\text{SUM}(0x\textit{A}5,\text{CMD}, \text{MIS0\_DATA1},\ldots,\text{MOSI\_DATA}[N-4]),0x\textit{FF}) \quad (3)$$

The contact TC11 is connected with a communication request signal /WAKE for requesting communication from the accessory 200 to the camera control circuit A 101. The communication request signal /WAKE is pulled up to the camera microcomputer power supply VMCU_C via a resistor. The camera control circuit A 101 can receive a communication request from the accessory 200 by detecting a trailing edge in the communication request signal /WAKE.

SDA connected to the contact TC12 and SCL connected to the contact TC13 are signals for performing Inter-Integrated Circuit (I2C) communication in which the camera control circuit A 101 is a communication master. SDA and SCL are open-drain communications pulled up by the camera microcomputer power supply VMCU_C, and have communication frequencies of 100 kbps in this embodiment. In the I2C communication, both data transmission from the camera 100 and data transmission from the accessory 200 are performed via SDA. The communication speed of the I2C communication is lower than that of the SPI communication. The SPI communication has a communication speed higher than that of the I2C communication, and therefore is suitable for information communication having a large amount of data. Thus, in the communication between the camera 100 and the accessory 200 in this embodiment, information having a large amount of data is communicated by using the SPI communication, and information having a small amount of data is communicated by using the I2C communication. For example, data is first communicated by using the I2C communication, and when the SPI communication is available or needs to be executed based on this data, control can be made to further execute the SPI communication.

Figure 12A:
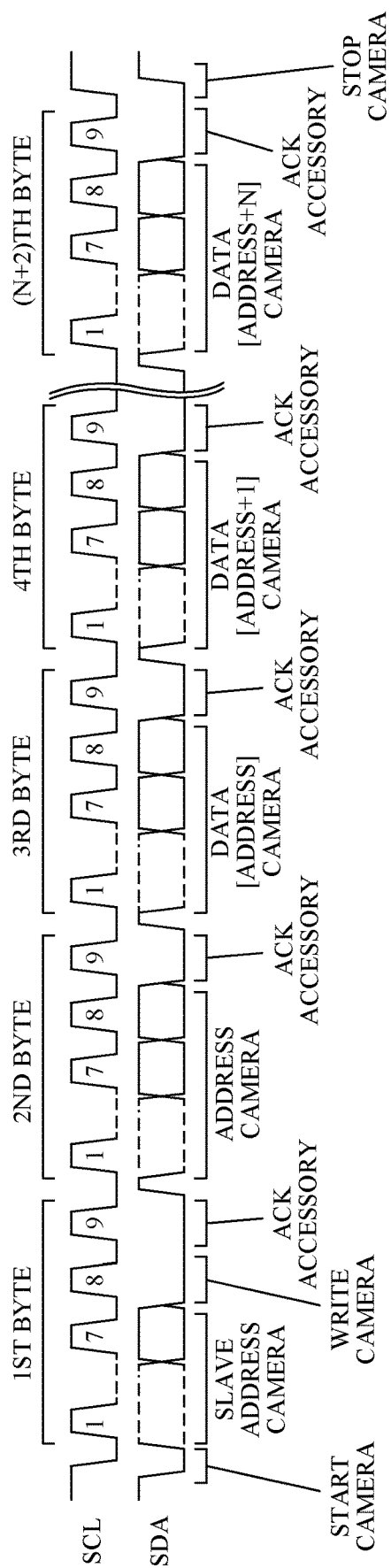
FIGS. 12A and 12B illustrate an example of an I2C communication waveform in this embodiment.
Figure 12B:
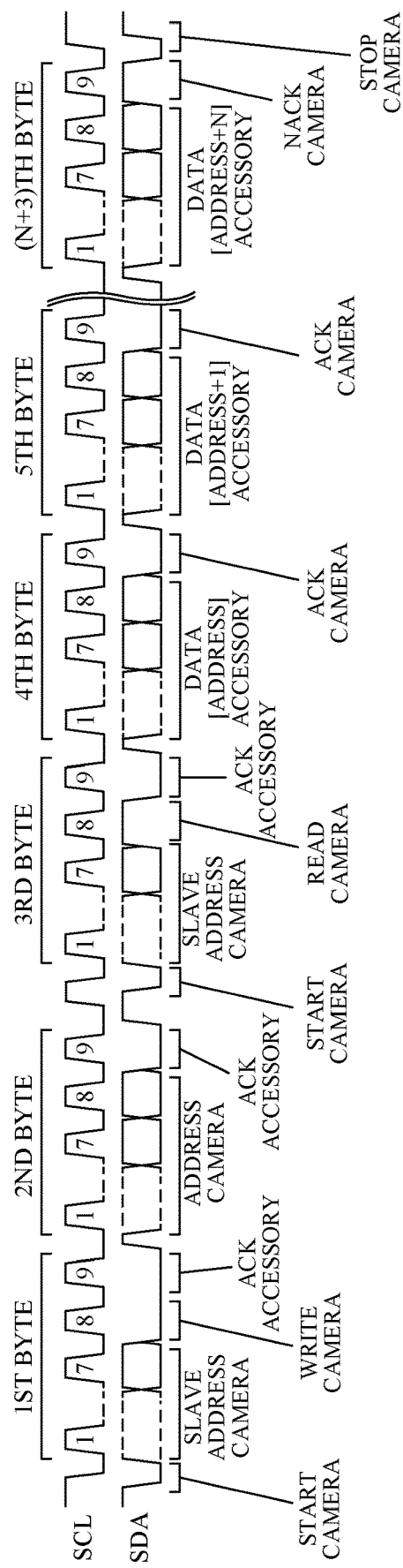

FIGS. 12A and 12B illustrate examples of I2C communication waveforms. FIG. 12A illustrates a waveform example in a case where the camera transmits N-byte data (DATA [1] to DATA [N]) to the accessory, and FIG. 12B illustrates a waveform example in a case where the camera receives N-byte data (DATA [1] to DATA [N]) from the accessory. In FIGS. 12A and 12B, an upper waveform illustrates SCL and a lower waveform illustrates SDA.

Illustrated below the SDA waveform are the meaning of a signal at each timing and whether a control circuit for controlling the output level of the SDA signal is the camera control circuit A 101 or the accessory control circuit 201. The communication data includes 1-byte unit data and 1-bit information indicating a response. A top of each figure illustrates the number of bytes of data from the communication start to facilitate a description. Since details of the communication contents will be described below with reference to FIGS. 13 to 15, an outline will be described with reference to FIGS. 12A and 12B.

In FIG. 12A, in the first-byte communication and the second-byte communication, the camera control circuit A 101 notifies the accessory control circuit 201 of storage address information on data to be transmitted. In the third-byte communication to the (N+2)th-byte communication, the camera control circuit A 101 transmits N-byte data (DATA [ADDRESS] to DATA [ADDRESS+N]) to the accessory control circuit 201.

In FIG. 12B, in the first-byte communication and the second-byte communication, the camera control circuit A 101 notifies the accessory control circuit 201 of storage address information on data to be received. In the third-byte communication to the (N+3)th-byte communication, the camera control circuit A 101 receives N-byte data (DATA [ADDRESS] to DATA [ADDRESS+N]) from the accessory control circuit 201.

Figure 13:
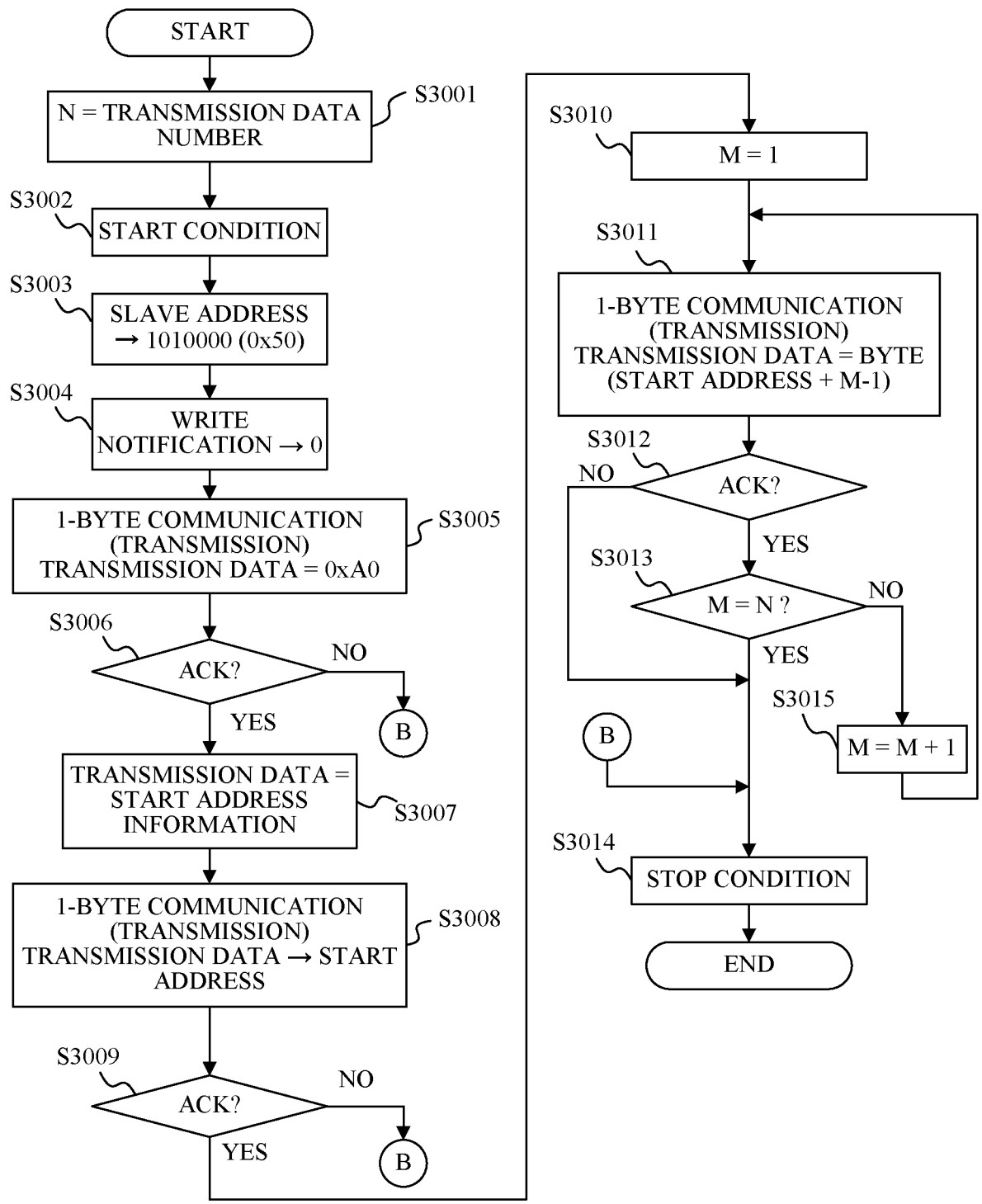
FIG. 13 illustrates processing to be performed by the camera control circuit A in the case where N-byte data is transmitted from the camera control circuit A to the accessory control circuit in this embodiment.

Next, flowcharts of FIGS. 13 to 15 will be described. The flowchart in FIG. 13 illustrates processing to be performed by the camera control circuit A 101 when the camera control circuit A 101 transmits N-byte data to the accessory control circuit 201.

In step S3001, the camera control circuit A 101 stores a numerical value indicating the number of bytes to be transmitted in internal variable N. For example, when 3 bytes are transmitted, 3 is stored. In this embodiment, 3 is stored.

In step S3002, the camera control circuit A 101 changes SDA to a low level while SCL is at a high level (START condition). Thereby, the accessory control circuit 201 is notified of a communication start.

In step S3003, the camera control circuit A 101 sets slave address information indicating a slave address of the accessory control circuit 201 to the upper 7 bits of the transmission data. In this embodiment, assume that the slave address of the accessory control circuit 201 is 1010000 in binary.

In step S3004, the camera control circuit A 101 sets information indicating that it is write communication to the lower 1 bit of the transmission data. Setting this bit to 0 means the write communication.

In step S3005, the camera control circuit A 101 transmits to the accessory control circuit 201 data that has been set as the transmission data in steps S3003 and S3004 (10100000 in binary and 0xA0 in hexadecimal).

In step S3006, the camera control circuit A 101 outputs SCL for one clock and confirms the signal level of SDA after transmitting the 1-byte data. In the case where the signal level of SDA is low, it is determined to be a data reception notification (ACK) from the accessory control circuit 201 and the flow proceeds to step S3007. On the other hand, in the case where the signal level of SDA is high, it is determined that the accessory control circuit 201 has not normally received the data and the flow proceeds to step S3014.

In step S3007, the camera control circuit A 101 sets to transmission data the storage address information (start address information) of the data to be transmitted to the accessory control circuit 201. In this embodiment, the size of the start address information is 1 byte, and the value is 0x00.

In step S3008, the camera control circuit A 101 transmits the set 1-byte start address information (value 0x00) to the accessory control circuit 201.

In step S3009, the camera control circuit A 101 outputs SCL for one clock and confirms the signal level of SDA after transmitting the 1-byte start address information data. In the case where the signal level of SDA is low, it is determined to be a data reception notification (ACK) from the accessory control circuit 201 and the flow proceeds to step S3010. On the other hand, in the case where the signal level of SDA is high, it is determined that the accessory control circuit 201 has not normally received the data and the flow proceeds to step S3014.

In step S3010, the camera control circuit A 101 stores 1 in internal variable M. The internal variable M is a variable for counting the number of transmission data.

In step S3011, the camera control circuit A 101 outputs 1-byte data to the accessory control circuit 201 by outputting 1-byte SCL and by changing SDA to the desired signal level while SCL is at a low level. Here, the start address information is 0x00 and the internal variable M is 1, and thus 1-byte data corresponding to the address 0x00 is transmitted.

In step S3012, the camera control circuit A 101 outputs SCL for one clock and confirms the signal level of SDA after transmitting the 1-byte data. In the case where the signal level of SDA is low, it is determined to be a data reception notification (ACK) from the accessory control circuit 201 and the flow proceeds to step S3013. On the other hand, in the case where the signal level of SDA is high, it is determined that the accessory control circuit 201 has not normally received the data and the flow proceeds to step S3014.

In step S3013, the camera control circuit A 101 confirms whether the internal variable M has the same value as that of the internal variable N. In the case where the internal variable M has the same value as that of the internal variable N, it is determined that the transmissions of all data have been completed and the flow proceeds to step S3014. In the case where the internal variable M is not the same value as that of the internal variable N, it is determined that there are still data to be transmitted and the flow proceeds to step S3015.

In step S3015, the camera control circuit A 101 adds 1 to the internal variable M and the flow returns to step S3011.

Thus, after the flow returns to step S3011, the camera control circuit A 101 sequentially increments the addresses of the data to be transmitted, and transmits 1-byte data corresponding to each address. In this way, the camera control circuit A 101 transmits N-byte data to the accessory control circuit 201 by repeatedly transmitting 1-byte data until the internal variable M and the internal variable N have the same value in the processing in step S3013. In the case where the internal variable N is set to 3 as in this embodiment, 3-byte data can be transmitted.

In step S3014, the camera control circuit A 101 changes SDA to a high level while SCL is at a high level (STOP condition). Thereby, the accessory control circuit 201 is notified of a communication end.

Figure 14:
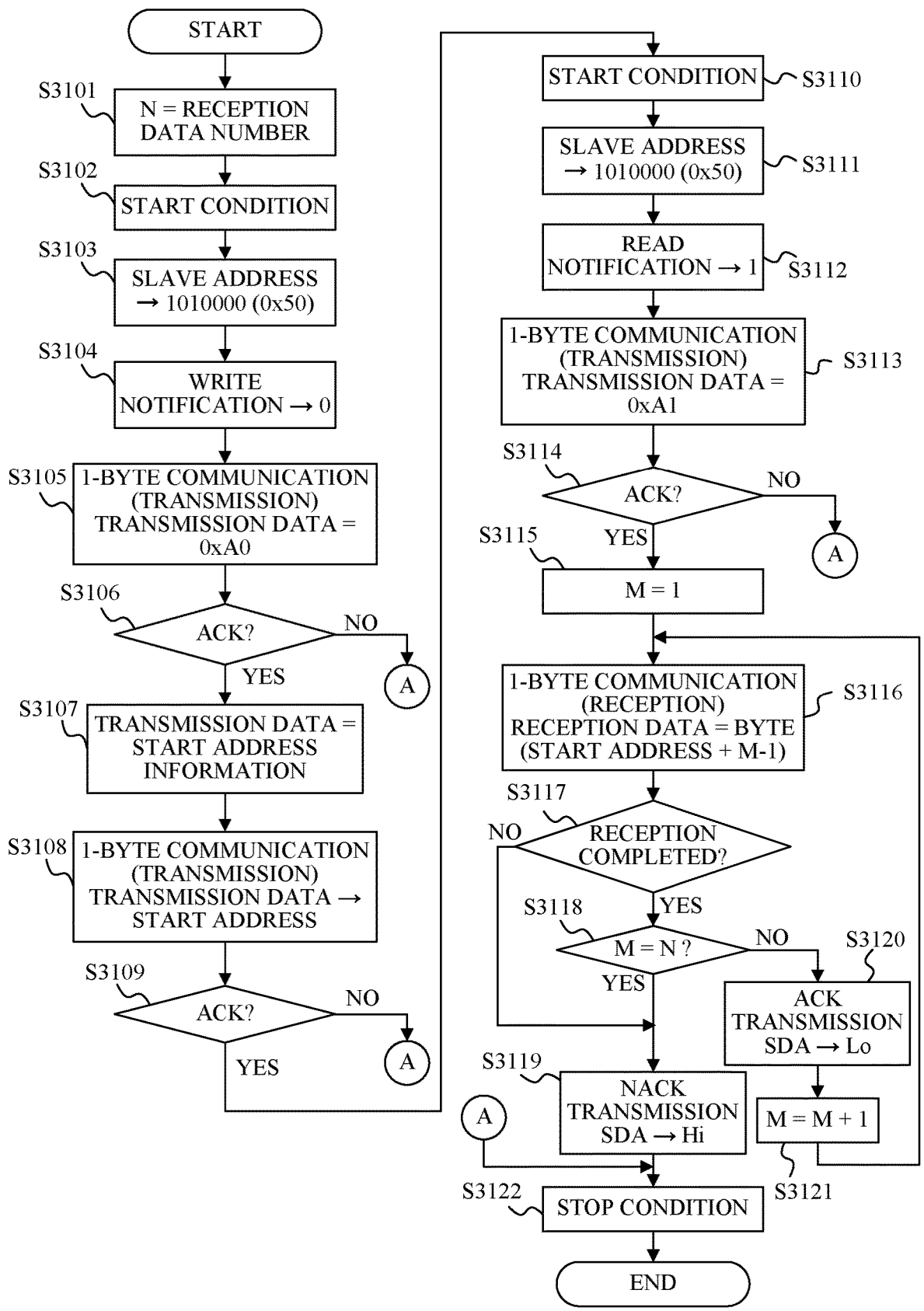
FIG. 14 illustrates processing to be performed by the camera control circuit A in the case where the camera control circuit A receives N-byte data from the accessory control circuit in this embodiment.

A flowchart in FIG. 14 illustrates processing to be performed by the camera control circuit A 101 when the camera control circuit A 101 receives N-byte data from the accessory control circuit 201.

In step S3101, the camera control circuit A 101 stores a numerical value indicating the number of bytes to be received in internal variable N. For example, in the case where 3-byte data is received, 3 is stored. In this embodiment, 3 is stored.

In step S3102 to step S3106, the camera control circuit A 101 performs the same processing as step S3002 to step S3006, respectively, and thus a description thereof will be omitted.

In step S3107, the camera control circuit A 101 sets to transmission data storage address information (start address information) of the data received from the accessory control circuit 201. In this embodiment, the size of the start address information is 1 byte, and the value is 0x00.

In step S3108, the camera control circuit A 101 transmits the set 1-byte start address information (value 0x00) to the accessory control circuit 201.

In step S3109, the camera control circuit A 101 outputs SCL for one clock and confirms the signal level of SDA after transmitting the 1-byte start address information data. In the case where the signal level of SDA is low, it is determined to be a data reception notification (ACK) from the accessory control circuit 201 and the flow proceeds to step S3110. On the other hand, in the case where the signal level of SDA is high, it is determined that the accessory control circuit 201 has not normally received the data and the flow proceeds to step S3122.

In step S3110, the camera control circuit A 101 changes SDA to a low level while SCL is at a high level, and notifies the accessory control circuit 201 of the START condition, as in step S3102.

In step S3111, the camera control circuit A 101 sets slave address information indicating a slave address of the accessory control circuit 201 to the upper 7 bits of the transmission data. In this embodiment, assume that the slave address of the accessory control circuit 201 is 1010000 in binary.

In step S3112, the camera control circuit A 101 sets the information indicating that it is read communication to the lower 1 bit of the transmission data. Setting this bit to 1 means read communication.

In step S3113, the camera control circuit A 101 transmits to the accessory control circuit 201 data (10100001 in binary and 0xA1 in hexadecimal) that has been set as the transmission data in steps S3003 and S3004.

In step S3114, the camera control circuit A 101 outputs SCL for one clock and confirms the signal level of SDA after transmitting the 1-byte data. In the case where the signal level of SDA is low, it is determined to be a data reception notification (ACK) from the accessory control circuit 201 and the flow proceeds to step S3115. On the other hand, in the case where the signal level of SDA is high, it is determined that the accessory control circuit 201 has not normally received the data, and the flow proceeds to step S3122.

In step S3115, the camera control circuit A 101 stores 1 in internal variable M. The internal variable M is a variable for counting the number of reception data.

In step S3116, the camera control circuit A 101 outputs 1-byte SCL and reads the signal level of SDA at a timing when SCL changes from a low level to a high level. This configuration enables the 1-byte data to be received from the accessory control circuit 201. The received 1-byte data can be stored in the volatile memory 125 or used for predetermined processing as data corresponding to the address 0x00.

In step S3117, the camera control circuit A 101 determines whether or not 1-byte data has normally been received. In the case of the normal reception, the flow proceeds to step S3118. Without the normal reception, the flow proceeds to step S3119.

In step S3118, the camera control circuit A 101 confirms whether the internal variable M has the same value as that of the internal variable N. If the internal variable M has the same value as that of the internal variable N, it is determined that the receptions of all data have been completed and the flow proceeds to step S3119. If the internal variable M is not the same value as that of the internal variable N, it is determined that there are still data to be received and the flow proceeds to step S3120.

In step S3120, the camera control circuit A 101 provides the accessory control circuit 201 with a data reception notification (ACK) and notifies it of performing continuous data communication by outputting 1-byte SCL and by performing control for changing SDA to a low level.

In step S3121, the camera control circuit A 101 adds 1 to the internal variable M and the flow returns to step S3116.

Thus, after the flow returns to step S3116, the camera control circuit A 101 sequentially increments the address of the data to be received, and receives 1-byte data corresponding to each address. In this way, the camera control circuit A 101 receives N-byte data from the accessory control circuit 201 by repeatedly receiving 1-byte data until the internal variable M and the internal variable N have the same value in the processing in step S3118. In the case where the internal variable N is set to 3 as in this embodiment, 3-byte data can be received.

In step S3119, the camera control circuit A 101 outputs 1-byte SCL and performs control for changing SDA to a high level to notify the accessory control circuit 201 that the data communication has been completed (NACK).

In step S3122, the camera control circuit A 101 changes SDA to a high level while SCL is at the high level (STOP condition). Thereby, the accessory control circuit 201 is notified of a communication end.

Figure 15A:
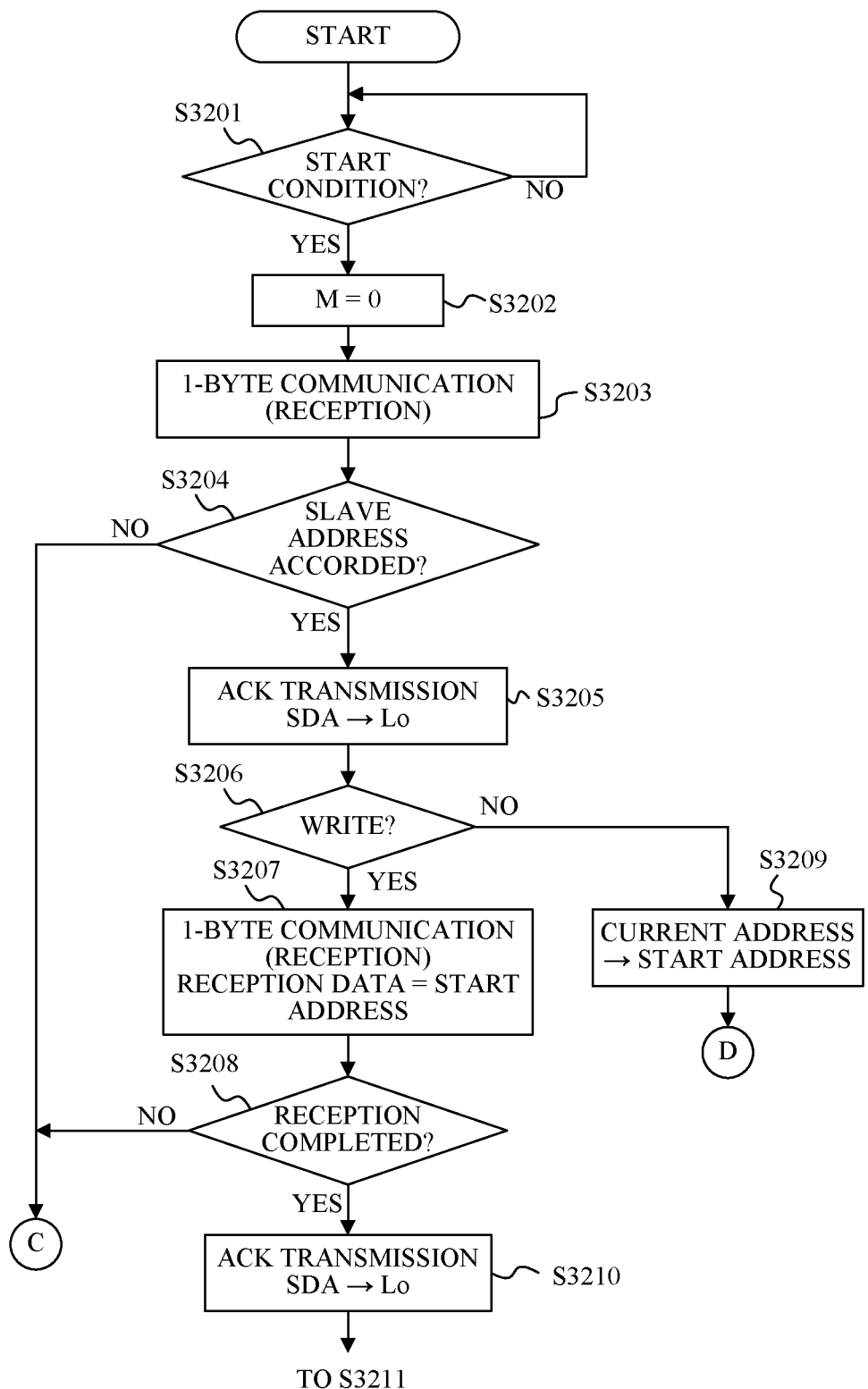
FIGS. 15A and 15B illustrate processing to be performed by the accessory control circuit in the case where N-byte data is communicated between the camera control circuit A and the accessory control circuit in this embodiment.
Figure 15B:
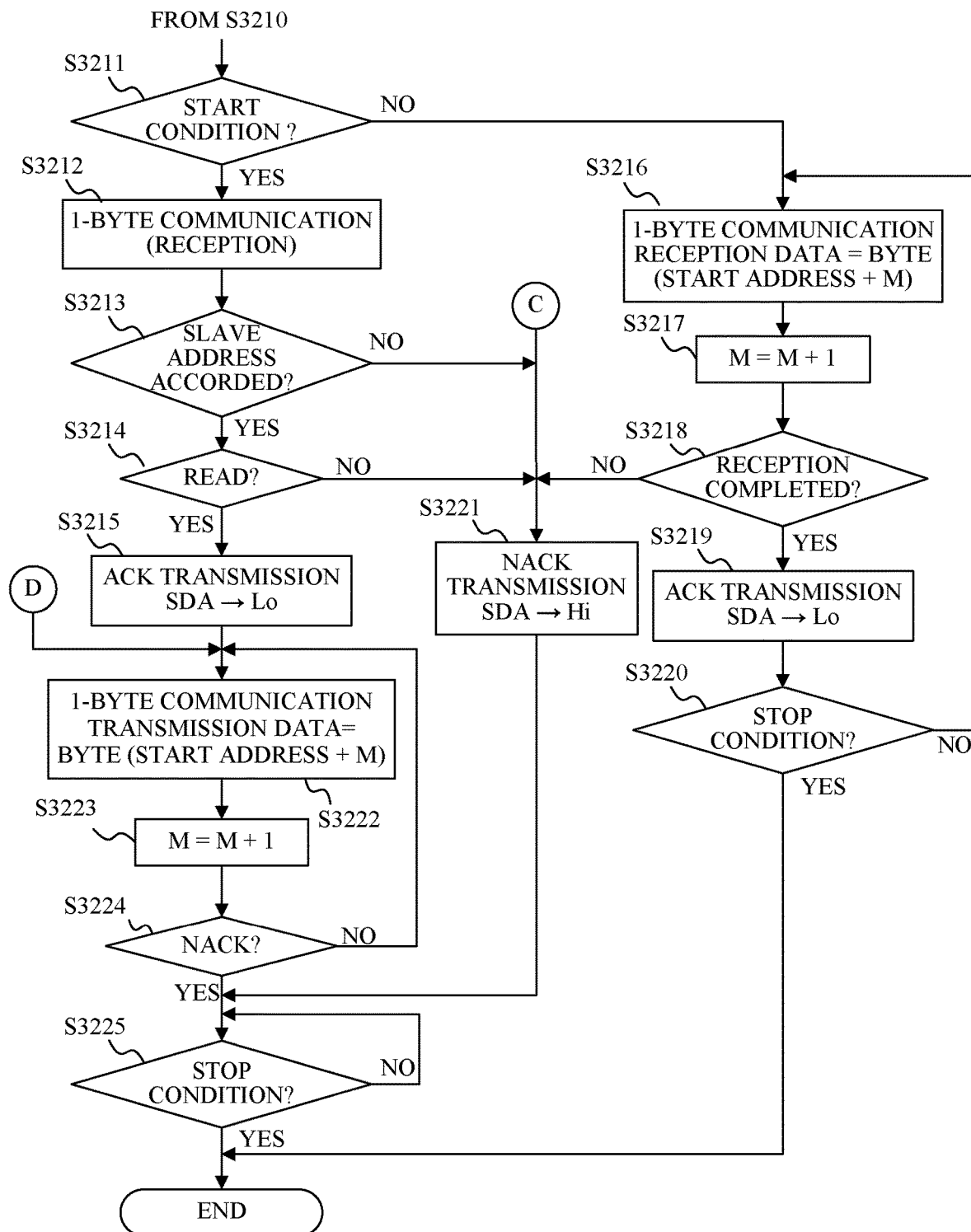

FIGS. 15A and 15B illustrate processing to be performed by the accessory control circuit 201 in the case where the camera control circuit A 101 transmits N-byte data to the accessory control circuit 201 and in the case where the camera control circuit A 101 receives N-byte data from the accessory control circuit 201.

In step S3201, the accessory control circuit 201 waits for SDA to change to a low level (START condition) while SCL is at the high level. When the accessory control circuit 201 detects the START condition, the flow proceeds to step S3202.

In step S3202, the accessory control circuit 201 stores 0 in internal variable M. The internal variable M is a variable for counting the number of transmission data and the number of reception data.

In step S3203, the accessory control circuit 201 receives 1-byte data transmitted from the camera control circuit A 101.

In step S3204, the accessory control circuit 201 determines whether the upper 7-bit data of the 1-byte data received in step S3203 accords with the slave address (0x50 in this embodiment) of the accessory control circuit 201. In the case where the address accords with the slave address of the accessory control circuit 201, the flow proceeds to step S3205. In the case where the address does not accord with the slave address of the accessory control circuit 201, the flow proceeds to step S3221.

In step S3205, the accessory control circuit 201 provides a data reception notification (ACK) to the camera control circuit A 101 by performing control for changing SDA to a low level for the next SCL clock output after receiving the 1-byte data.

In step S3206, the accessory control circuit 201 determines the type of data for the next 1-byte communication based on the lower 1-bit data of the 1-byte data received in step S3203. In the case where the lower 1-bit data is 0, it is determined that the data of the next 1-byte communication is start address information from the camera control circuit A 101 to the accessory control circuit 201 and the flow proceeds to step S3207. In the case where the lower 1-bit data is 1, it is determined that the data of the next 1-byte communication is transmission data from the accessory control circuit 201 to the camera control circuit A 101 and the flow proceeds to step S3209.

In step S3207, the accessory control circuit 201 receives 1-byte data transmitted from the camera control circuit A 101. The received 1-byte data is information indicating addresses in which data to be transmitted and received in the subsequent communication is stored. In this embodiment, assume that start address information is 0x00 as described with reference to FIGS. 13 and 14.

On the other hand, in step S3209, the accessory control circuit 201 uses, for the start address information, address information previously stored in the accessory control circuit 201 or the address information previously notified from the camera control circuit A 101.

In step S3208, in the case where the accessory control circuit 201 determines that the 1-byte data could normally be received, the flow proceeds to step S3210. In the case where it is determined that the 1-byte data could not normally be received, the flow proceeds to step S3221.

In step S3210, the accessory control circuit 201 provides a data reception notification (ACK) to the camera control circuit A 101 by performing control for changing SDA to a low level for the next SCL clock output after receiving the 1-byte data.

In step S3211, the accessory control circuit 201 confirms whether SDA has changed to the low level (START condition) while SCL is at a high level. In the case where the accessory control circuit 201 detects the START condition, the accessory control circuit 201 determines that 1-byte data to be communicated next is data to be transmitted from the camera control circuit A 101 to the accessory control circuit 201 and indicating a slave address and a communication type. Then, the flow proceeds to step S3212. In the case where the accessory control circuit 201 does not detect the START condition, the accessory control circuit 201 determines that the 1-byte data to be communicated next is data information received by the accessory control circuit 201 from the camera control circuit A 101. Then, the flow proceeds to step S3216.

In step S3212, the accessory control circuit 201 receives the 1-byte data transmitted from the camera control circuit A 101.

In step S3213, the accessory control circuit 201 determines whether the upper 7-bit data of the 1-byte data received in step S3212 accords with the slave address (0x50 in this embodiment) of the accessory control circuit 201. In the case where the upper 7-bit data accords with the slave address of the accessory control circuit 201, the flow proceeds to step S3214. In the case where the upper 7-bit data does not accord with the slave address of the accessory control circuit 201, the flow proceeds to step S3221.

In step S3214, the accessory control circuit 201 determines a data type for the next 1-byte communication based on the lower 1-bit data of the 1-byte data received in step S3203. In the case where the lower 1-bit data is 0, the flow proceeds to step S3221. In the case where the lower 1-bit data is 1, it is determined that the data of the next 1-byte communication is transmission data from the accessory control circuit 201 to the camera control circuit A 101 and the flow proceeds to step S3215.

In step S3215, the accessory control circuit 201 provides a data reception notification (ACK) to the camera control circuit A 101 by performing control for changing SDA to a low level for the next SCL clock output after receiving the 1-byte data.

In step S3222, the accessory control circuit 201 transmits to the camera control circuit A 101 1-byte data corresponding to the start address information received from the camera control circuit A 101 in step S3207 or the start address information determined in step S3209.

In step S3223, the accessory control circuit 201 adds 1 to the internal variable M, and the flow proceeds to step S3224.

In step S3224, the accessory control circuit 201 confirms the signal level of SDA after transmitting the 1-byte data. In the case where the signal level of SDA is high, the camera control circuit A 101 determines that it is a notification (NACK) that all data has been received, and the flow proceeds to step S3225. On the other hand, in the case where the signal level of SDA is high, it is determined that the camera control circuit A 101 continues to request a data transmission from the accessory control circuit 201, and the flow returns to step S3222. Thus, after the flow returns to step S3222, the accessory control circuit 201 sequentially increments the address of the data to be transmitted, and transmits 1-byte data corresponding to each address. Thus, by repeatedly transmitting the 1-byte data from the camera control circuit A 101 until NACK is notified in the processing in step S3224, the accessory control circuit 201 transmits N-byte data to the camera control circuit A 101.

In step S3225, the accessory control circuit 201 waits for a STOP condition in which the SDA changes to a high level while SCL is at a high level. When the accessory control circuit 201 detects the STOP condition, the communication is terminated.

On the other hand, in step S3216, the accessory control circuit 201 receives 1-byte data, and stores the 1-byte data in an unillustrated nonvolatile memory as data corresponding to the start address information received from the camera control circuit A 101 in step S3207 or uses it for predetermined processing.

In step S3217, the accessory control circuit 201 adds 1 to the internal variable M and the flow proceeds to step S3218.

In step S3218, if the accessory control circuit 201 determines that 1-byte data could normally be received, the flow proceeds to step S3219. If it is determined that the 1-byte data could not normally be received, the flow proceeds to step S3221.

In step S3219, the accessory control circuit 201 provides a data reception notification (ACK) to the camera control circuit A 101 by performing control for changing SDA to a low level for the next SCL clock output after receiving the 1-byte data.

In step S3230, the accessory control circuit 201 confirms whether SDA changes to a high level (STOP condition) while SCL is at a high level. In the case where the accessory control circuit 201 detects the STOP condition, the accessory control circuit 201 terminates the communication. On the other hand, in the case where the accessory control circuit 201 does not detect the STOP condition, the accessory control circuit 201 determines that data will be continuously transmitted from the camera control circuit A 101 to the accessory control circuit 201. Then, the flow returns to step S3216.

Thus, after the flow returns to step S3216, the accessory control circuit 201 sequentially increments an address of data to be received, and receives 1-byte data corresponding to each address. By repeatedly receiving the 1-byte data until the STOP condition is notified in step S3220, the accessory control circuit 201 receives N-byte data from the camera control circuit A 101.

FIG. 4 explains accessory information that the accessory 200 has in an unillustrated nonvolatile memory. As illustrated in FIG. 4, the accessory information is mapped in the memory space at addresses 0x00 to 0x0F, and the accessory information can be read out of the accessory 200 by the I2C communication. In the I2C communication according to this embodiment, a checksum value for read data is added as the final data of the communication. Details of the accessory information will be described below.

An FNC1 signal connected to the contact TC14, an FNC2 signal connected to the contact TC15, an FNC3 signal connected to the contact TC16, and an FNC4 signal connected to the contact TC17 are functional signals whose function is variable according to the type of the attached accessory 200. For example, in the case where the accessory 200 is a microphone device, a signal communicated via TC15 is a voice data signal, and in the case where the accessory 200 is an illumination device (strobe device), a signal communicated via TC14 is a signal that notifies the light emission timing.

A signal that realizes a different function may be communicated via the same contact depending on the type of the attached accessory. For example, in a case where the accessory 200 is an accessory other than an illumination device, a synchronization signal for controlling a timing different from a light emission timing may be communicated via TC14. TC14 to TC17 correspond to functional signal contacts. Communication using at least one of the functional signal contacts will be also referred to as functional signal communication.

The functional signal communication can be executed at a timing independent of the I2C communication and SPI communication in parallel with the I2C communication and SPI communication. The accessory type, as used herein, means the above microphone device, illumination device, etc. Accessories that achieve the same purpose, such as illuminations with different performances, belong to the same type of accessories. Accessories that achieve different purposes, such as a microphone device and an illumination device, are different types of accessories. The functional signal communication is executed based on information acquired by the I2C communication or the SPI communication.

The contact TC18 as a second ground contact is also connected to GND, and is a contact that serves as a reference potential for the camera 100 and the accessory 200, similarly to the contact TC04. A differential signal D2N connected to the contact TC19 and a differential signal D2P connected to the contact TC20 are data communication signals in which they perform data communications in pairs, and are connected to the camera control circuit B 102. For example, USB communication can be performed via TC19 and TC20. The contact TC21 is connected to GND and can be used not only as a reference potential contact but also as a contact for controlling wiring impedances of the differential signals D2N and D2P. The contact TC21 corresponds to a fourth ground contact.

The contacts TC01, TC04, TC06, TC18, and TC21 are connected to, for example, a GND portion of a flexible printed circuits (FPC) substrate, and the GND portion of the FPC substrate is fixed to a metallic member which serves as the GND level of the camera 100, with a screw or the like. The metallic member serving as the GND level includes, for example, an engagement member engageable with the accessory 200 in the accessory shoe portion, an unillustrated base plate inside the camera 100, and the like.

In this embodiment, the attachment detecting contact TC06 to which the accessory attachment detecting signal /ACC_DET is connected is disposed next to the contact (first clock contact) TC07 that transmits the clock signal SCLK (first clock signal). In general, noise (clock noise) associated with a potential fluctuation of a clock signal is transmitted to a contact adjacent to the contact of the clock signal, which may cause malfunction. In particular, this influence is significant in a configuration that has many contacts and a short distance between the contacts as in this embodiment. Accordingly, by disposing the attachment detecting contact TC06 next to the SCLK contact TC07, the influence of the clock noise can be suppressed.

The accessory attachment detecting signal /ACC_DET is pulled up before the accessory is attached, but is set to the GND potential after the accessory is attached. On the other hand, since the SCLK contact TC07 for transmitting the clock signal does not transmit the clock signal and the potential does not fluctuate before the accessory is attached. The potential fluctuates because the clock signal is transmitted only after the accessory is attached.

When the SCLK contact TC07 transmits a clock signal, the attachment detecting contact TC06 is at a GND potential. Therefore, even if the attachment detecting contact TC06 receives clock noise, the potentials of the control circuits of the camera 100 and the accessory 200 are less likely to fluctuate, so that malfunction can be prevented. In addition, the clock noise can be restrained from transmitting to a position farther than the attachment detecting contact TC06. As a result, it is unnecessary to provide a GND terminal, and thus the influence of clock noise can be suppressed without increasing the number of contacts.

SCL (second clock signal) as a clock signal is also transmitted to the contact (second clock contact) TC13. However, SCLK transmitted to the SCLK contact TC07 has a higher frequency than that of SCL, and the SCLK contact TC07 generates more clock noise than the SCL contact TC13. Therefore, disposing the attachment detecting contact TC06 next to the SCLK contact TC07 instead of next to the SCL contact TC13 is more effective in preventing malfunction caused by clock noise.

In addition to the difference in frequency, SCL transmitted by the SCL contact TC13 is a clock signal of an I2C communication standard, and a voltage fluctuation of a signal line is driven by the open-drain connection. On the other hand, SCLK transmitted by the SCLK contact TC07 is a clock signal of an SPI communication standard, and a voltage fluctuation of a signal line is driven by the CMOS output. Therefore, the SCL contact TC13 tends to have a gentler edge of the voltage fluctuation than that of the SCLK contact TC07, and clock noise is less likely to occur. Hence, disposing the attachment detecting contact TC06 next to the SCLK contact TC07 rather than next to the SCL contact TC13 is more effective in preventing malfunction caused by clock noise.

The differential signals D1N and D1P may be transmitted in pairs to the first and second differential signal contacts TC19 and TC20 to transmit the clock signal. In that case, a clock signal (third clock signal) having a higher frequency than those of the SCLK contact TC07 and the SCL contact TC13 may be transmitted. However, the differential signals D1N and D1P are pair signals, and thus the clock noise emission is less than those of the SCLK contact TC07 and the SCL contact TC13 that transmit single-ended signals. Therefore, it is more effective to prevent malfunction caused by the clock noise by disposing the attachment detecting contact TC06 next to the SCLK contact TC07 instead of next to the first and second differential signal contacts TC19 and TC20.

The contact (first data contact) TC08 disposed next to the SCLK contact TC07 on the opposite side of the attachment detecting contact TC06 transmits MOSI (first data signal). Since MOSI is a data signal, it appears that MOSI is susceptible to clock noise. However, MOSI is a data signal of the same SPI communication standard as the clock signal transmitted by the SCLK contact TC07, and thus the potential fluctuation timing is synchronized with the clock signal and is less likely to be affected by the clock noise. Therefore, the contact TC08 does not have to be fixed to the GND potential and can be used as the MOSI contact.

The accessory 200 has a battery 205 and receives power supply from the battery 205 and also receives power supply from the camera 100 via the camera connector 141 and the accessory connector 211. The accessory control circuit 201 as a control unit of the accessory 200 is a circuit that controls the entire accessory 200, and includes a processor (microcomputer) that includes a CPU etc.

The accessory power supply circuit 202 is a circuit that generates a power supply for supplying power to each circuit in the accessory 200, and includes a DC/DC converter circuit, LDO, a charge pump circuit, and the like. A voltage of 1.8V generated by the accessory power supply circuit 202 is constantly supplied as accessory microcomputer power supply VMCU_A to the accessory control circuit 201. The voltage generated by the accessory power supply circuit 202 may be different from 1.8V. Control over the accessory power supply circuit 202 can provide turning-on and off control over the power supply to each circuit in the accessory 200.

A charging circuit 204 is a circuit for charging the battery 205 using the power supplied from the camera 100. The accessory control circuit 201 controls the charging circuit 204 to charge the battery 205 in the case where the accessory control circuit 201 can determine that sufficient power is supplied from the camera 100 to perform a charging operation. In this embodiment, the battery 205 is attached to the accessory 200, but the accessory 200 may be operated only by a power supply from the camera 100 without attaching the battery 205. In this case, the charging circuit 204 is unnecessary.

A differential communication circuit 207 is a circuit for performing differential communication with the camera 100, and can communicate data with the camera 100. An external communication IF circuit 208 is an IF circuit for performing data communication with an unillustrated external device, such as an Ethernet communication IF, a wireless LAN communication IF, and a public network communication IF.

The accessory control circuit 201 controls the differential communication circuit 207 and the external communication IF circuit 208 to transmit data received from the camera 100 to the external device and data received from the external device to the camera 100. The functional circuit 206 is a circuit having different functions depending on the type of the accessory 200. The functional circuit 206 is, for example, a light-emitting circuit, a charging circuit, or the like in the case where the accessory 200 is a strobe device. In the case where the accessory 200 is a microphone device, it is a voice codec circuit, a microphone circuit, or the like.

An external connection terminal 209 is a connector terminal for connection to an external device, and is a USB TYPE-C connector in this embodiment. A connection detecting circuit 210 is a circuit for detecting that an external device has been connected to the external connection terminal 209. The accessory control circuit 201 can detect the connection of the external device to the external connection terminal 209 by receiving an output signal of the connection detecting circuit 210.

A power supply switch 203 is a switch for turning on and off the operation of the accessory 200. The accessory control circuit 201 can detect a turning-on position and a turning-off position by reading a signal level of a terminal to which the power supply switch 203 is connected.

An operation switch 212 is a switch for operating the accessory 200 and includes a button, a cross key, a slide switch, a dial switch, and the like. When the operation switch 212 is operated, the accessory control circuit 201 detects the operation and executes predetermined processing according to the operation.

An accessory connector 211 is a connector electrically connectable to the camera 100 via 21 contacts TA01 to TA21 that are arranged in a row. The contacts TA01 to TA21 are arranged in this order from one end to the other end in the arrangement direction.

The contact TA01 is connected to GND and serves not only as a reference potential contact but also as a contact for controlling wiring impedances of the differential signals D1N and D1P. The contact TA01 corresponds to a third ground contact.

The differential signal D1N connected to the contact TA02 and the differential signal D1P connected to the contact TA03 are data communication signals in which they perform data communication in pairs, and are connected to the differential communication circuit 207. The contacts TA02, TA03, TA07 to TA17 described below, TA19 and TA20 are communication contacts.

The contact TA04 as a first ground contact is connected to GND and serves as a reference potential contact for the camera 100 and the accessory 200. The contact TA04 is disposed outside the contact TA05 described below in the arrangement direction of the contacts. The accessory power supply circuit 202 and the charging circuit 204 are connected to TA05 as a power supply contact, and the accessory power supply VACC supplied from the camera 100 is connected to the contact TA05. The contact TA06 as an attachment detecting contact is directly connected to GND. When the accessory 200 is attached to the camera 100, the contact TA06 turns the accessory attachment detecting signal /ACC_DET described above to a low level (GND potential). Thereby, the camera 100 can detect the attachment of the accessory 200. SCLK connected to the contact TA07 as a communication contact, MOSI connected to the contact TA08, MISO connected to the contact TA09, and CS connected to the contact TA10 are signals for the accessory control circuit 201 to act as a communication slave to perform SPI communication.

A communication request signal /WAKE for requesting communication from the accessory control circuit 201 to the camera 100 is connected to the contact TAU. When the accessory control circuit 201 determines that communication with the camera 100 is necessary, the accessory control circuit 201 requests the camera 100 for communication by changing the communication request signal /WAKE to a low output.

When power is supplied from the camera control circuit 101 to the accessory 200 via TC5 in response to detecting an attachment of the accessory 200, the accessory control circuit 201 notifies the camera control circuit 101 that the power supply has been received by changing the signal level (by changing the potential) of the communication request signal /WAKE from a high level to a low level.

The accessory control circuit 201 can notify that there is a factor that causes the accessory 200 to communicate with the camera 100 by changing the signal level (potential) of the communication request signal /WAKE from a high level to a low level even if there is no request from the camera. With this configuration, the camera control circuit 101 can omit an operation of periodically checking, through polling, whether or not the accessory 200 has a factor that requires communication. The accessory 200 can communicate with the camera 100 on a real-time basis when the communication requiring factor occurs.

SDA connected to the contact TA12 as a communication contact and SCL connected to the contact TA13 are signals for the accessory control circuit 201 to serve as a communication slave to perform I2C communication.

An FNC1 signal connected to the contact TA14, an FNC2 signal connected to the contact TA15, an FNC3 signal connected to the contact TA16, and an FNC4 signal connected to the contact TA17 are functional signals whose functions are variable according to the type of accessory 200. For example, in the case where the accessory 200 is a microphone device, they can be voice data signals, and in the case where the accessory 200 is a strobe device, they can be signals for notifying a light emission timing.

The contact TA18 as a second ground contact is also connected to GND, and is a reference potential contact for the camera 100 and the accessory 200, similar to the contact TA04. The differential signal D2N connected to the contact TA19 and the differential signal D2P connected to the contact TA20 are data communication signals in which they perform data communication in pairs, and are connected to the external connection terminal 209. The contact TA21 is connected to GND and can be used not only as a reference potential contact but also as a terminal for controlling the wiring impedances of the differential signals D2N and D2P. TA21 corresponds to a fourth ground contact.

The contacts TA01, TA04, TA06, TA18, and TA21 are connected to, for example, the GND portion of the FPC substrate, and the GND portion of the FPC substrate is fixed to a metallic member which serves as the GND level of the accessory 200, with an unillustrated screw. The metallic member serving as the GND level includes, for example, a shoe attachment leg engageable with the accessory shoe portion of the camera 100, an unillustrated base plate inside the accessory 200, and the like.

Figure 5:
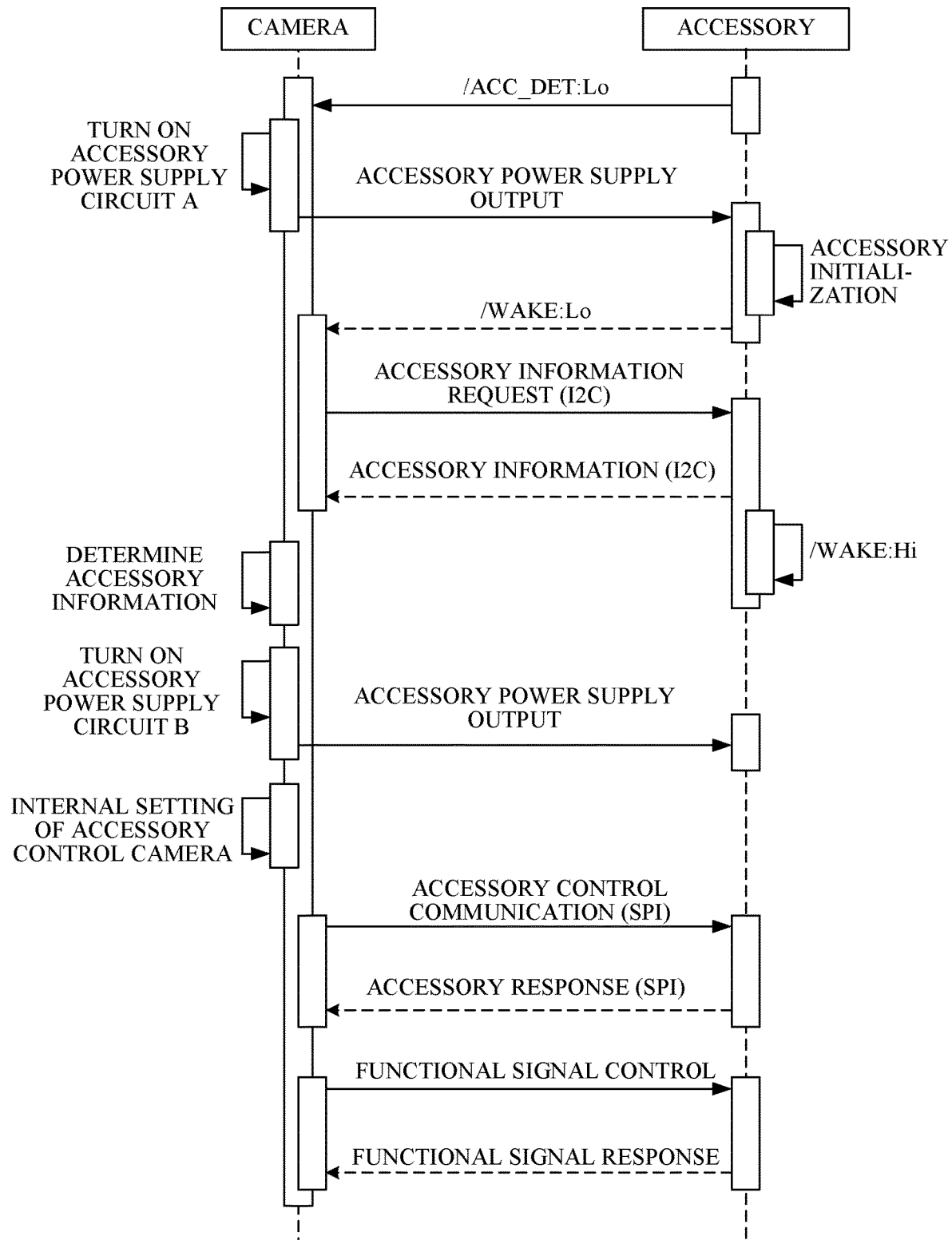
FIG. 5 is a sequence diagram illustrating operations of the camera and accessory according to the first embodiment.

FIG. 5 illustrates operations (processing) of the camera 100 and the accessory 200 when the accessory 200 is attached to the camera 100. A detailed description will now be given below of processing of each of the camera 100 and the accessory 200.

When the accessory 200 is attached to the camera 100, the accessory attachment detecting signal /ACC_DET becomes at a GND level, and the camera control circuit A 101 determines that the accessory 200 has been attached to the camera 100. When the camera control circuit A 101 determines that the accessory 200 has been attached, the camera control circuit A 101 sets power supply control signal CNT_VACC1 to a high level in order to turn on the output of the accessory power supply circuit A 131. The accessory power supply circuit A 131 outputs the accessory power supply VACC as soon as the power supply control signal CNT_VACC1 becomes at a high level.

When the accessory power supply circuit 202 receives VACC in the accessory 200, the accessory power supply circuit 202 generates the power supply VMCU_A for the accessory control circuit 201 and the accessory control circuit 201 is started. After the accessory control circuit 201 is started, the accessory control circuit 201 initializes each block in the accessory 200. Thereafter, when the accessory control circuit 201 is ready to communicate with the camera 100, the accessory control circuit 201 sets the communication request signal /WAKE to a low level.

In the camera 100, the camera control circuit A 101 detects that the accessory 200 is in a communicable state by detecting that a /WAKE terminal has become at a low level. The camera control circuit A 101 requests the accessory information by the I2C communication.

In the accessory 200, the accessory control circuit 201 transmits the accessory information in response to the accessory information request from the camera 100. The accessory control circuit 201 when transmitting the accessory information sets the communication request signal /WAKE to a high level.

In the camera 100, the camera control circuit A 101 determines whether or not the attached accessory is controllable etc. by determining the received accessory information. The camera control circuit A 101 turns on the accessory power supply circuit B 132. The camera control circuit A 101 when completing various settings for the camera 100 notifies the camera control circuit B 102 of the accessory information. The camera control circuit B 102 provides the accessory 200 with a notification of a control command and a control of a functional signal by the SPI communication based on the accessory type information. The accessory control circuit 201 responds to the control command by the SPI communication from the camera 100 and performs control in accordance with the functional signal.

A description will now be given of the accessory information illustrated in FIG. 4. D7-D0 data at address 0x00 is information indicating a type of the accessory. FIG. 6 explains accessory type information as the accessory information. For example, 0x81 indicates a strobe device, 0x82 indicates an interface conversion adapter device, 0x83 indicates a microphone device, and 0x84 indicates a multi-accessory connection adapter device for attaching a plurality of accessory devices to the camera 100.

Here, the adapter device is an intermediate accessory attached between the camera 100 and the accessory such as a strobe device and a microphone device. The interface conversion adapter device is an adapter device that converts the interface so as to provide compatibility between the camera 100 and the accessory when the interface of the camera 100 and the interface of the accessory are different. The multi-accessory connection adapter device is an adapter device to which a plurality of accessories are attachable.

D7-D0 data at address 0x01 is information indicating a model number of the accessory 200. The model of the accessory can be uniquely identified by the accessory type information described above and this information. D7-D0 data at address 0x02 is information indicating a firmware version of the accessory 200.

D7-D6 data at address 0x03 is information indicating whether or not a supply of the accessory power supply VACC to the accessory 200 is to be requested while an unillustrated power supply switch of the camera 100 is turned off. In the case where the information is 0, no power supply is requested. In the case where the information is 1, a power supply is requested by the accessory power supply circuit A 131. In the case where the information is 2, a power supply is requested by the accessory power supply circuit B 132. D5-D4 data at address 0x03 is information indicating whether or not to request the accessory 200 for a supply of the accessory power supply VACC when the camera 100 is in the power-saving mode. In the case where the information is 0, it means that no power supply is necessary. In the case where the information is 1, it means that there is a power supply requested by the accessory power supply circuit A 131. In the case where the information is 2, it means that there is a power supply requested by the accessory power supply circuit B 132. D3-D2 data at address 0x03 is information indicating whether or not the accessory 200 has the battery 205. In the case where the information is 0, it means that the accessory 200 has no battery, and in the case where the information is 1, it means that the accessory 200 has the battery. D1-D0 data at address 0x03 is information indicating whether or not the accessory 200 has a charging function for the battery 205. In the case where the information is 0, it means that the accessory 200 has no charging function, and in the case where it is 1, it means that the accessory 200 has the charging function.

D7-D0 data at address 0x04 is information indicating required power to the accessory power supply VACC with which the accessory 200 is supplied from the camera 100. A value obtained by multiplying this information by 10 indicates a current value. In a case where this information is 10, it means 100 mA, and in a case where this information is 100, it means 1 A.

In order to reduce an information amount of this information, this information may be simply associated with an arbitrary current value. For example, in the case where this information is 0, it may mean 100 mA, in the case where this information is 1, it may mean 300 mA, in the case where this information is 3, it may mean 450 mA, and in the case where this information is 4, it may mean 600 mA.

D7 data at address 0x05 is information indicating whether or not the accessory 200 is in a firmware update mode state (information indicating the operation mode of the accessory 200). In the case where the information is 0, it means that the accessory 200 is not in the firmware update mode state, and in the case where it is 1, it means that the accessory 200 is in the firmware update mode state. D6 data at address 0x05 is information indicating whether or not the accessory 200 has a firmware update function. In the case where the information is 0, it means that the accessory 200 has no firmware update function. In the case where the information is 1, it means that the accessory 200 has the firmware update function. D5-D4 data at address 0x05 is information indicating whether or not an operation of the accessory 200 that is attached to an intermediate (connection) accessory is to be permitted (supported). In the case where the information is 0, it means that the operation is not permitted, and in the case where it is 1, it means that the operation is permitted. D3-D2 data at address 0x05 is information indicating whether or not the accessory 200 needs the camera 100 to confirm an attachment state of the intermediate accessory when the camera 100 is started. In the case where the information is 0, it means that the confirmation is unnecessary, and in the case where it is 1, it means that the confirmation is necessary. D1-D0 data at address 0x05 is information indicating whether or not the accessory 200 supports a command notification by the I2C communication. In the case where this information is 0, it means that the command notification is not supported, and in the case where it is 1, it means that the command notification is supported.

D5-D4 data at address 0x06 is information indicating a communication method that can be used to notify the camera 100 of a factor of a communication request after the accessory 200 notifies the camera 100 of communication request signal /WAKE. In the case where the information is 0, it means that the I2C communication method is supported. In the case where the information is 1, it means that the SPI communication method is supported. In the case where the information is 2, it means that both the I2C communication method and the SPI communication method are supported. D3-D0 data at address 0x06 is information indicating whether or not the accessory 200 has functions corresponding to the FNC1 signal, the FNC2 signal, the FNC3 signal, and the FNC4 signal. D0 data corresponds to the FNC1 signal, D1 data corresponds to the FNC2 signal, D2 data corresponds to the FNC3 signal, and D3 data corresponds to the FNC4 signal. In the case where the value is 0, it means that the accessory 200 does not have that function. In the case where the value is 1, the accessory 200 has that function.

D7 data at address 0x0A is information indicating whether or not the accessory 200 requests the camera 100 for a start when the accessory 200 notifies the camera 100 of the communication request signal /WAKE. In the case where the information is 0, it means that the start is requested, and in the case where it is 1, it means that the start is not requested. D6-D0 data at address 0x0A is information indicating a factor of the communication request signal /WAKE of which the accessory 200 notifies the camera 100. FIG. 7 explains a factor number and a factor content of a communication request, and illustrates examples of factors of the communication request signal /WAKE. In this example, the accessory 200 is a microphone device. For example, a factor number 0x00 is a number indicating that a menu call switch in the operation switch 212 has been pressed. A factor number 0x01 is a number indicating that the accessory 200 has completed an output control of an audio signal. A factor number 0x02 is a number indicating that the accessory 200 has completed mute processing of the audio signal. Thus, the camera 100 can be notified of information on the generating factor of the communication request signal /WAKE.

D1 data at address 0x0C is information indicating an SPI communication protocol supported by the accessory 200, and in the case where the information is 0, it means that the accessory 200 supports SPI protocol A, and in the case where it is 1, it means that the accessory 200 supports SPI protocol B. D0 data at address 0x0C is information indicating a control logic of the CS signal in the SPI communication supported by the accessory 200. In the case where the information is 0, it means that the CS signal is a low-active logic, and in the case where it is 1, it means that the CS signal is a high-active logic. D7-D0 data at address 0x0D is information indicating the time required as a communication byte interval in the case where the accessory 200 performs communication in accordance with the SPI protocol A and the D7 data at the address 0x05 is 0 or the accessory 200 is not in the firmware update mode state. D7-D0 data at address 0x0E is information indicating the time required as a communication byte interval when the accessory 200 performs communication in accordance with the SPI protocol A and the D7 data at the address 0x05 is 1 or the accessory 200 is in the firmware update mode state.

FIGS. 8A and 8B explain communication data interval information on the SPI communication, and illustrates a relationship between information on data at the address 0x0D and data at the address 0x0E and the time (communication interval) between communication bytes. FIG. 8A illustrates the relationship between the time between communication bytes and the data at the address 0x0D, and FIG. 8B illustrates the relationship between the time between communication bytes and the data at the address 0x0E. D7-D0 data at the address 0x0F is information indicating a checksum.

Figure 9:
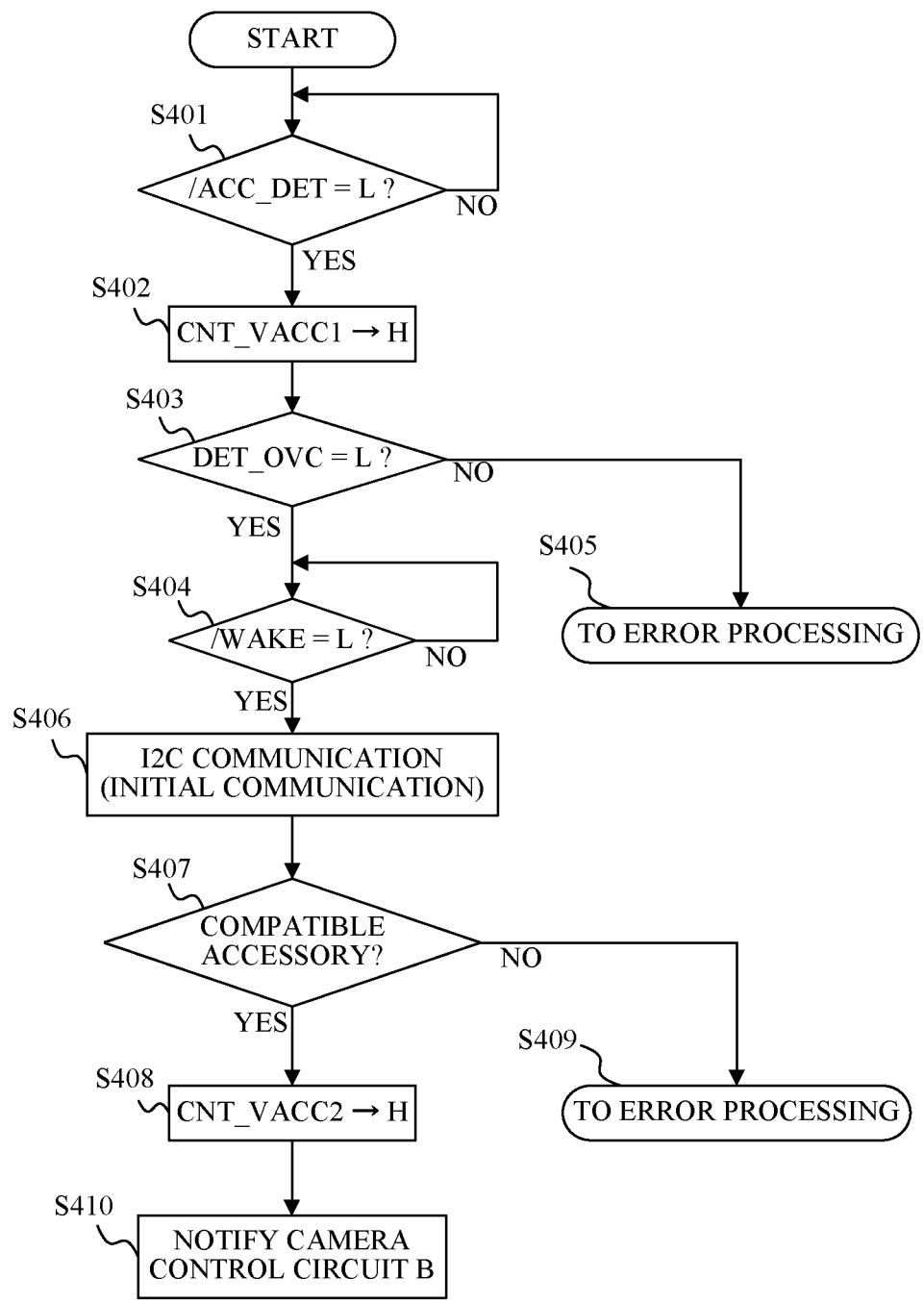
FIG. 9 is a flowchart illustrating an operation of the camera control circuit A according to the first embodiment.

FIG. 9 is a flowchart illustrating an operation of the camera control circuit A, and illustrates processing of the camera control circuit A101 from when the accessory 200 is attached to the camera 100 to when the functions of the accessory 200 are enabled.

In step S401, the camera control circuit A 101 monitors a signal level of the accessory attachment detecting signal /ACC_DET, and determines (detects) whether or not the accessory 200 is attached. In the case where the signal level of the accessory attachment detecting signal /ACC_DET is high, the camera control circuit A 101 determines that the accessory 200 has not yet been attached and the flow returns to step S401 so as to again determines whether the accessory 200 has been attached. In the case where the signal level is low, the camera control circuit A 101 determines that the accessory 200 is attached, and the flow proceeds to step S402.

In step S402, the camera control circuit A 101 performs control for changing the power supply control signal CNT_VACC1 to a high level in order to turn on the output of the accessory power supply circuit A 131 and the flow proceeds to step S403. The accessory power supply circuit A131 outputs the accessory power supply VACC when the power supply control signal CNT_VACC1 becomes at the high level.

In step S403, the camera control circuit A 101 monitors a signal level of the overcurrent detecting signal DET_OVC and determines whether or not an overcurrent is flowing. In the case where the signal level of DET_OVC is low, the camera control circuit A 101 determines that no overcurrent is flowing and the flow proceeds to step S404, and in the case where the signal level is high, the camera control circuit A 101 determines that the overcurrent is flowing, and the flow proceeds to step S405 to perform error processing.

In step S404, the camera control circuit A 101 monitors a signal level of the communication request signal /WAKE as a notification signal from the accessory 200, and determines whether or not an initialization of the accessory 200 has been completed. The camera control circuit A 101 determines that the initialization has been completed if the signal level of the communication request signal /WAKE is low, and the flow proceeds to step S406. If the signal level is high, the camera control circuit A 101 determines that the initialization has not yet been completed and the flow returns to step S404, so that the camera control circuit A 101 again determines whether the initialization has been completed.

In step S406, the camera control circuit A 101 performs the I2C communication with the accessory 200 and reads out 15-byte accessory information. Then, the flow proceeds to step S407. In step S407, the camera control circuit A 101 determines whether or not the attached accessory 200 is an accessory compatible with the camera 100 (compatible accessory) based on the accessory information read out in step S406. When the camera control circuit A 101 determines that the attached accessory 200 is compatible, the flow proceeds to step S408, and when the camera control circuit A 101 determines that the attached accessory 200 is not compatible, the flow proceeds to step S409 to perform error processing.

In step S408, the camera control circuit A 101 performs control for changing the power supply control signal CNT_VACC2 to a high level in order to turn on the output of the accessory power supply circuit B 132. Then, the flow proceeds to step S410. The accessory power supply circuit B 132 outputs the accessory power supply VACC when the power supply control signal CNT_VACC2 becomes at the high level. In this embodiment, when control is performed so as to make both the power supply control signals CNT_VACC1 and CNT_VACC2 at high levels, the output from the accessory power supply circuit B 132 is supplied to the accessory power supply VACC. In step S410, the camera control circuit A 101 notifies the camera control circuit B 102 of the accessory information read out in step S406 so as to complete the start flow of the camera 100 in response to the attachment of the accessory 200.

Figure 10:
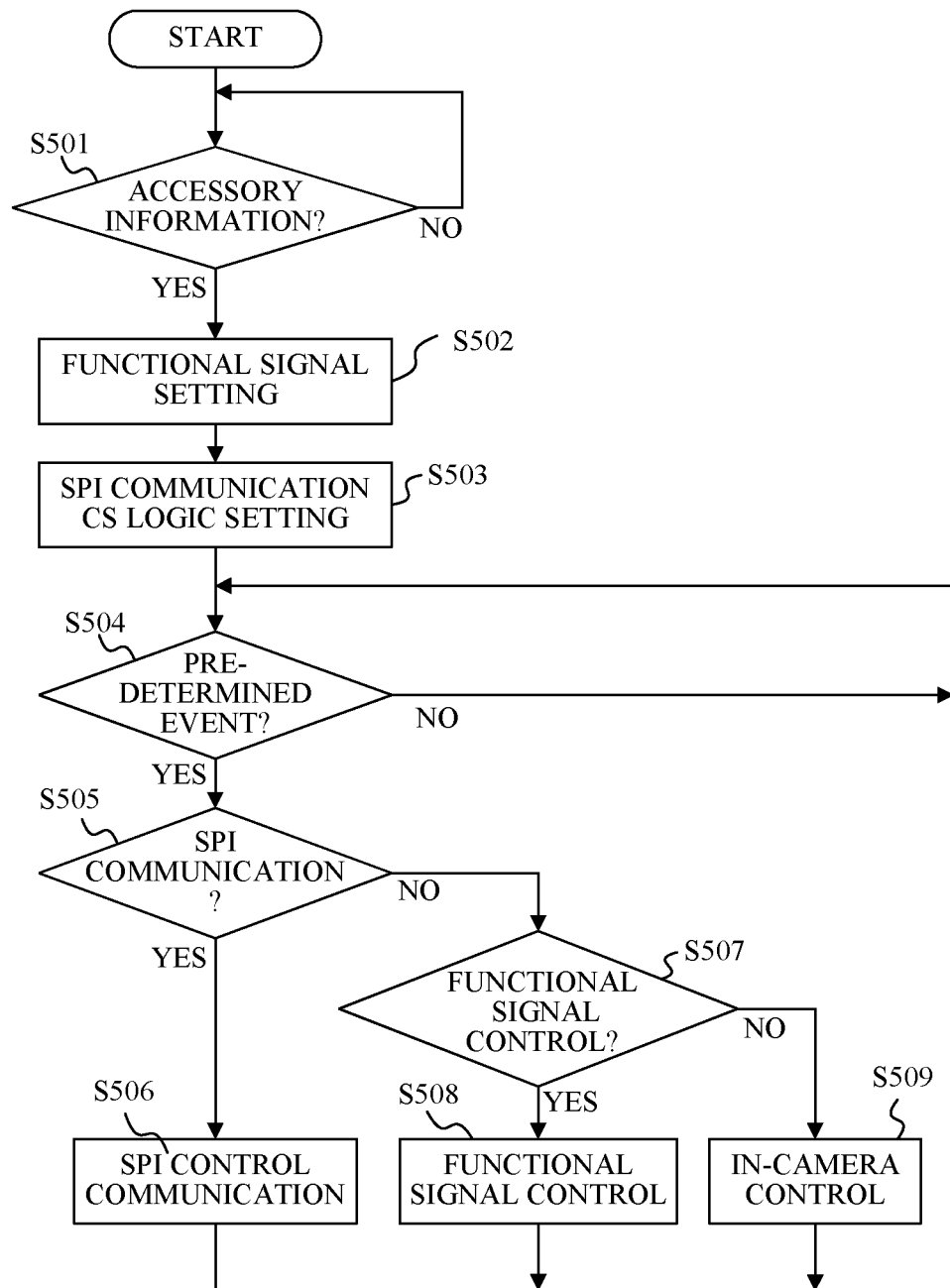
FIG. 10 is a flowchart illustrating an operation of the camera control circuit B according to the first embodiment.

FIG. 10 is a flowchart of an operation of the camera control circuit B 102 from when the accessory 200 is attached to the camera 100 to when the functions of the accessory 200 are enabled.

In step S501, the camera control circuit B 102 determines whether or not the accessory information has been notified from the camera control circuit A 101. If the accessory information has not yet been notified, the flow returns to step S501 and the camera control circuit B 102 again determines whether or not the accessory information has been notified (performs a detection operation). If the accessory information has been notified, the flow proceeds to step S502.

In step S502, the camera control circuit B 102 sets the functional signals FNC1 to FNC4 based on the accessory information notified from the camera control circuit A 101. For example, in the case where it is notified that the accessory 200 is a microphone device, FNC1 is set to function as voice data clock signal BCLK, FNC2 is set to function as voice data channel signal LRCLK, and FNC3 is set to function as voice data signal SDAT. As another example, in the case where it is notified that the accessory 200 is a strobe device, FNC 4 is set to function as strobe emission synchronization signal XOUT. For functional signals that do not require control over the accessory 200, the camera control circuit B 102 makes predetermined settings so as not to interfere with operations of the camera 100 and the accessory 200.

Next, in step S503, the camera control circuit B 102 sets the CS control logic in step SPI communication based on the accessory information notified from the camera control circuit A 101. Next, in step S504, the camera control circuit B 102 determines (detects) whether or not a predetermined event for the accessory 200 has occurred. If no event has occurred, the flow returns to step S504 and the camera control circuit B 102 again determines (detects) whether or not the event has occurred. If the event has occurred, the flow proceeds to step S505.

In step S505, the camera control circuit B 102 determines whether the event determined in step S504 is an event that requires the SPI communication with the accessory 200. The flow proceeds to step S506 if the detected event is the event that requires the SPI communication. The flow proceeds to step S507 if the detected event is not the event that requires the SPI communication.

In step S507, the camera control circuit B 102 determines whether or not the event determined in step S504 is an event that requires control over the accessory 200 using the functional signal. The flow proceeds to step S508 if the detected event is the event that requires the control using the functional signal, and the flow proceeds to step S509 if the detected event is not the event that requires the control using the functional signal.

In step S506, the camera control circuit B 102 performs the SPI communication with the accessory 200. The SPI communication performed in step S506 includes, for example, communication of an instruction to turn on or off the microphone operation, communication of an instruction to switch a sound collection directivity of the microphone, communication of an instruction to switch an equalizer function of the microphone, and the like in the case where the accessory 200 is a microphone device. In the case where the accessory 200 is a strobe device, the SPI communication includes communication for reading out setting information on the strobe device, communication for notifying the strobe device of the setting information, and the like. In the case where the SPI communication in step S506 is completed, the flow returns to step S504 and the camera control circuit B 102 again determines whether or not the event has occurred.

In step S508, the camera control circuit B 102 controls the accessory 200 using a functional signal. For example, in the case where the accessory 200 is a microphone device, the camera control circuit B 102 outputs the audio data clock signal BCLK of FNC1 and the audio data channel signal LRCLK of FNC2, and takes in the audio data signal SDAT of FNC3. Thereby, the camera 100 can acquire voice data from the accessory 200. In the case where the accessory 200 is a strobe device, the camera control circuit B 102 controls the strobe emission synchronization signal XOUT of FNC 4 at a predetermined timing. Thereby, the camera 100 can instruct the strobe device on a light emission. When the control using the predetermined functional signal is completed in step S508, the flow returns to step S504 and the camera control circuit B 102 again detects whether or not the event has occurred.

In step S509, the camera control circuit B 102 performs predetermined in-camera control according to the event detected in step S504. The in-camera control executed by step S509 includes, for example, control for starting or ending recording of voice data in the recording memory 126, control for performing equalizer processing for the voice data, and the like, in the case where the accessory 200 is a microphone device. In the case where the accessory 200 is a strobe device, the in-camera control includes photometric control for accumulating and acquiring light emitted by the strobe device using the image sensor 122, control for calculating an indicated value of a light emission amount of the strobe device, and the like. When the in-camera control is thus completed in step S509, the flow returns to step S504 and the camera control circuit B 102 again detects whether or not the event has occurred.

As described above, the camera 100 can control the attached accessory 200 in accordance with the flowcharts of FIGS. 9 and 10.

Figure 11:
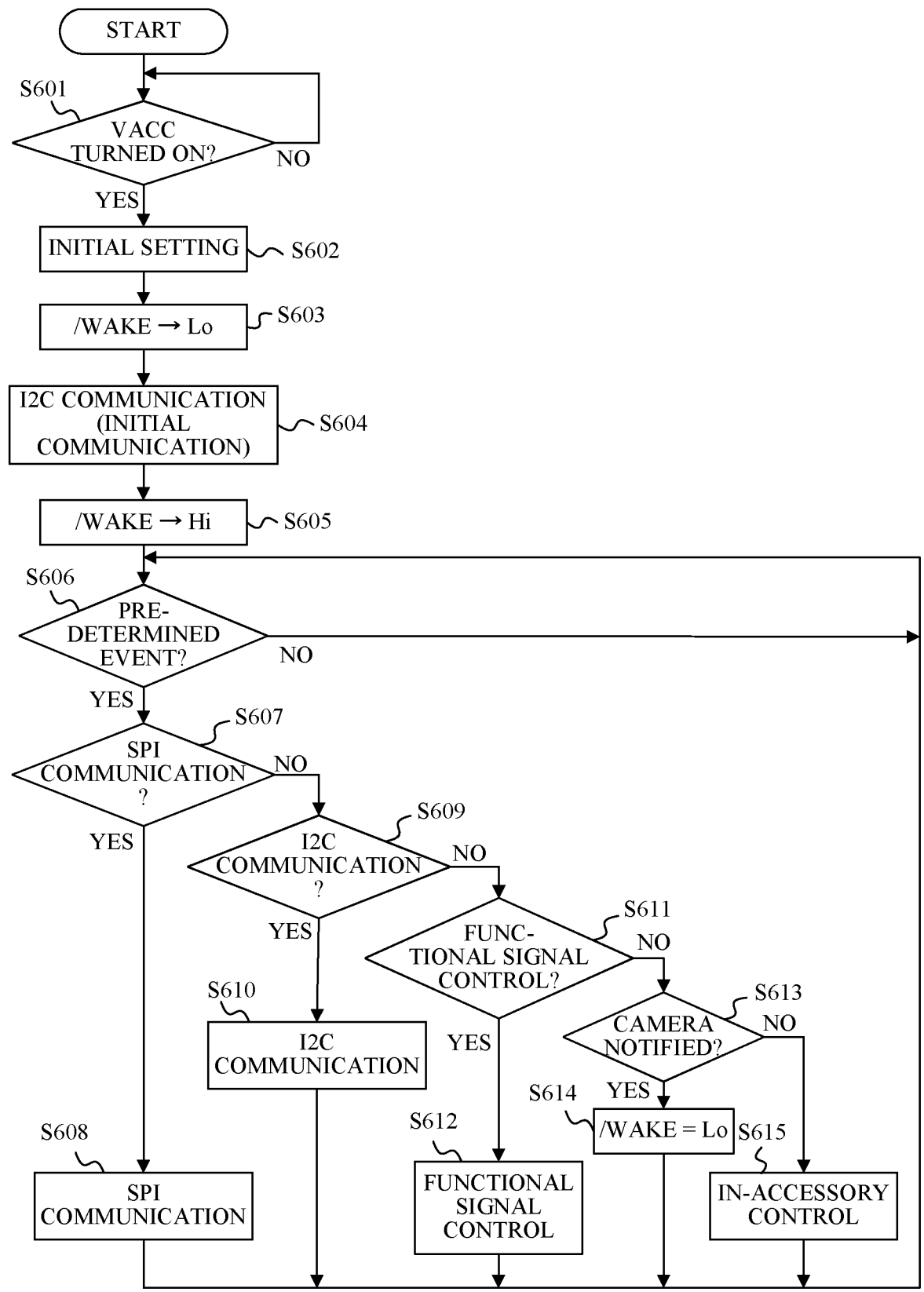
FIG. 11 is a flowchart illustrating the operation of the accessory control circuit according to the first embodiment.

FIG. 11 is a flowchart illustrating an operation of the accessory control circuit 201, and illustrates processing of the accessory control circuit 201 from when the accessory 200 is attached to the camera 100 to when the functions of the accessory 200 are operated.

In step S601, the accessory control circuit 201 waits for the accessory power supply VACC from the camera 100 to be turned on. In the case where the accessory 200 has no battery 205, turning on of the accessory power supply VACC is detectable when power is supplied to the accessory control circuit 201 and the operation of the accessory control circuit 201 itself is started. In the case where the accessory 200 has the battery 205, the accessory control circuit 201 can detect that the accessory power supply VACC is turned on even when the accessory control circuit 201 monitor the voltage value of the accessory power supply VACC in addition to the above functions. In the case where the accessory power supply VACC is turned on, the flow proceeds to step S602.

In step S602, the accessory control circuit 201 makes a predetermined initial setting. For example, the accessory control circuit 201 sets an operating frequency of the microcomputer, an input/output control port of the microcomputer, initialization of a timer function of the microcomputer, and initialization of an interrupt function of the microcomputer. When the initial setting in step S602 is completed, the flow proceeds to step S603. In step S603, the accessory control circuit 201 performs control for changing the communication request signal /WAKE to a low output and the camera 100 is notified that the initial setting is completed.

Next, in step S604, the accessory control circuit 201 responds to the I2C communication from the camera 100 and transmits 15-byte accessory information. The accessory information includes various information illustrated in FIG. 4, as described above. When the initial communication of S604 is completed, the flow proceeds to step S605. In step S605, the accessory control circuit 201 performs control for changing the communication request signal /WAKE to a high level. When the initial communication is completed, the flow proceeds to step S606. In step S606, the accessory control circuit 201 determines (detects) whether or not a predetermined event has occurred. If no event has occurred, the flow returns to step S606 and the accessory control circuit 201 again determines (detects) whether or not the event has occurred, and if the event has occurred, the flow proceeds to step S607.

In step S607, the accessory control circuit 201 determines whether or not the event determined in step S606 is an event that requires the SPI communication with the camera 100. The flow proceeds to step S608 if the detected event is the event that requires the SPI communication, and the flow proceeds to step S609 if the detected event is not the event that requires the SPI communication.

In step S609, the accessory control circuit 201 determines whether or not the event determined in step S606 is an event that requires I2C communication with the camera 100. The flow proceeds to step S610 if the detected event is the event that requires the I2C communication, and the flow proceeds to step S611 if the detected event is not the event that requires the I2C communication.

In step S611, the accessory control circuit 201 determines whether or not the event detected in step S606 is an event that requires control using a functional signal. The flow proceeds to step S612 if the detected event is the event that requires the control using the functional signal, and the flow proceeds to step S613 if the detected event is not the event that requires the control using the functional signal.

In step S613, the accessory control circuit 201 determines whether or not the event detected in step S606 is an event that notifies the camera 100 by the communication request signal /WAKE. The flow proceeds to step S614 if the detected event is the event that notifies the camera 100 by the communication request signal /WAKE, and the flow proceeds to step S615 if the detected event is not the event that notifies the camera 100 by the communication request signal /WAKE.

In step S608, the accessory control circuit 201 performs the SPI communication with the camera 100. In the case where the communication request signal /WAKE is at a low output state when the accessory control circuit 201 executes the SPI communication, the accessory control circuit 201 performs control for changing the communication request signal /WAKE to a high output state after the SPI communication. The SPI communication includes, for example, communication of an instruction to turn on a microphone operation from the camera 100, communication of an instruction to turn off the microphone operation, and communication of an instruction to switch a sound collection directivity of the microphone, in the case where the accessory 200 is a microphone device. The SPI communication further includes communication of an instruction to switch an equalizer function of the microphone. In the case where the accessory 200 is a strobe device, the SPI communication includes communication for reading out setting information on the strobe device, communication for notifying the strobe device of the setting information, and the like. When the predetermined SPI communication in step S608 is completed, the flow returns to step S606 and the accessory control circuit 201 again detects whether or not the event has occurred.

In step S610, the accessory control circuit 201 performs the I2C communication with the camera 100. In the case where the communication request signal /WAKE is at a low output state when the SPI communication is executed, control for changing the communication request signal /WAKE into a high output state is performed after the I2C communication. The I2C communication executed in step S610 includes, for example, communication for reading out a communication request factor for the signal notification of the communication request signal /WAKE of which the accessory control circuit 201 has notified the camera 100. When the predetermined I2C communication in step S610 is completed, the flow returns to step S606 and the accessory control circuit 201 again detects whether or not the event has occurred.

In step S612, the accessory control circuit 201 controls the camera 100 using a functional signal. The control includes, for example, reception control of the audio data clock signal BCLK of FNC1 and the audio data channel signal LRCLK of FNC2 output from the camera 100, in the case where the accessory 200 is a microphone device, and output control of the voice data signal SDAT of FNC3 in synchronization with these signals. In the case where the accessory 200 is a strobe device, the control includes reception control of the strobe emission synchronization signal XOUT of FNC4 for strobe emission control. When the control using the functional signal in step S612 is completed, the flow returns to step S606 and the accessory control circuit 201 again detects whether or not the event has occurred.

In step S614, the accessory control circuit 201 stores a communication request factor number to the camera 100 in response to the event determined in step S606 in an unillustrated volatile memory of the accessory 200, and performs control for changing the communication request signal /WAKE to a low output. The communication request factor number is a unique number assigned to each factor content as explained with reference to FIG. 7. When the low output control of the communication request signal /WAKE in step S614 is completed, the flow returns to step S606 and the accessory control circuit 201 again determines whether the event has occurred.

In step S615, the accessory control circuit 201 performs in-accessory control according to the event determined in step S606. The in-accessory control executed in step S615 includes, for example, detecting control of a remaining battery level, detecting control of an operation of the operation switch 212, and the like, in the case where the accessory 200 includes the battery 205. When the in-accessory control in step S615 is completed, the flow returns to step S606 and the accessory control circuit 201 again detects whether the event has occurred.

In accordance with the flowchart of FIG. 11, the accessory 200 can perform functional operations after the accessory 200 is attached to the camera 100.

Second Embodiment

Next follows a description of a second embodiment according to the present invention. From the viewpoint of the camera 100, this embodiment describes power supply processing to the accessory 200 when the camera 100 is started, and end processing when the camera 100 is powered off.

Figure 16A:
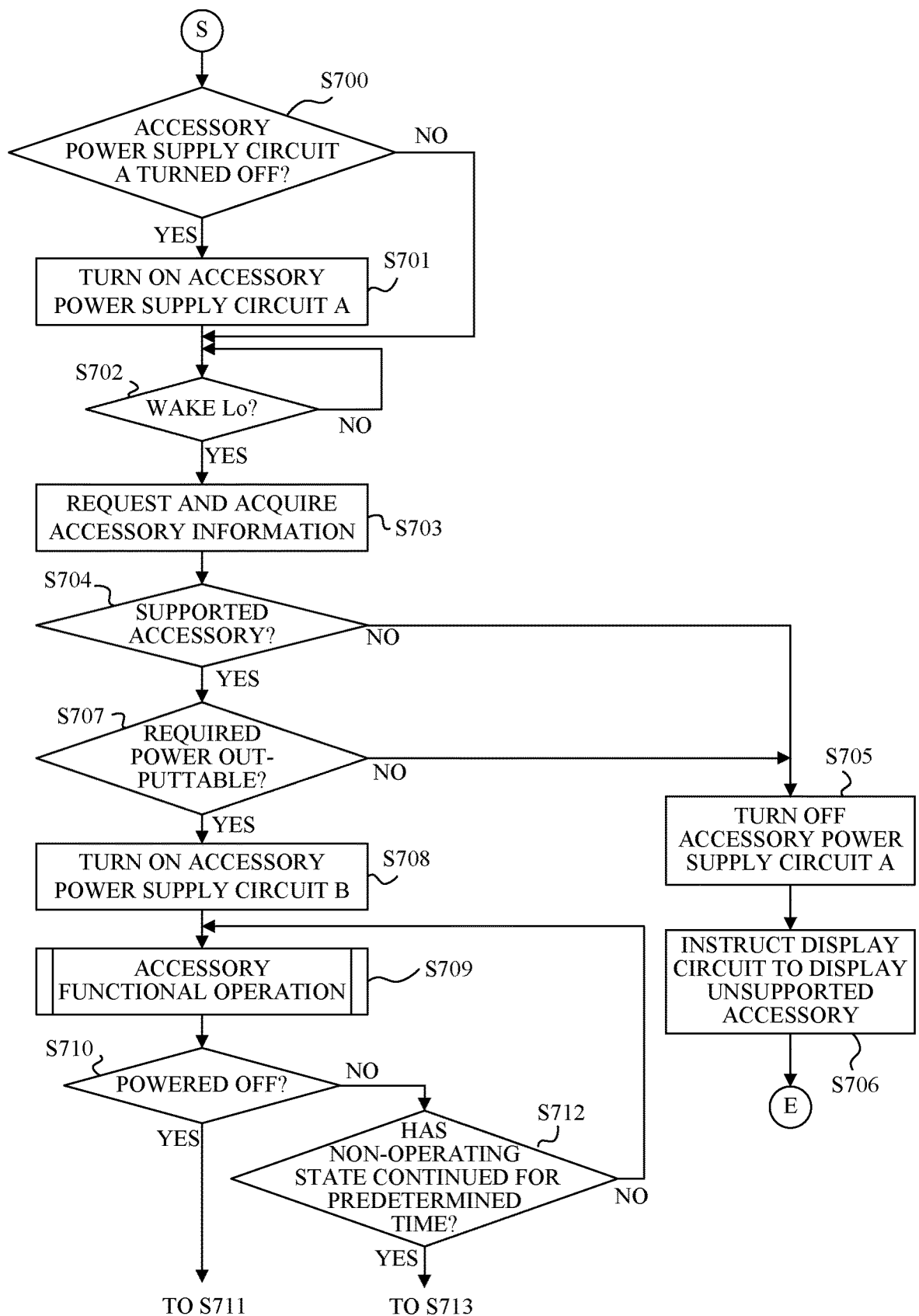
FIGS. 16A and 16B illustrate start processing and end processing of a camera according to second to fourth embodiments.
Figure 16B:
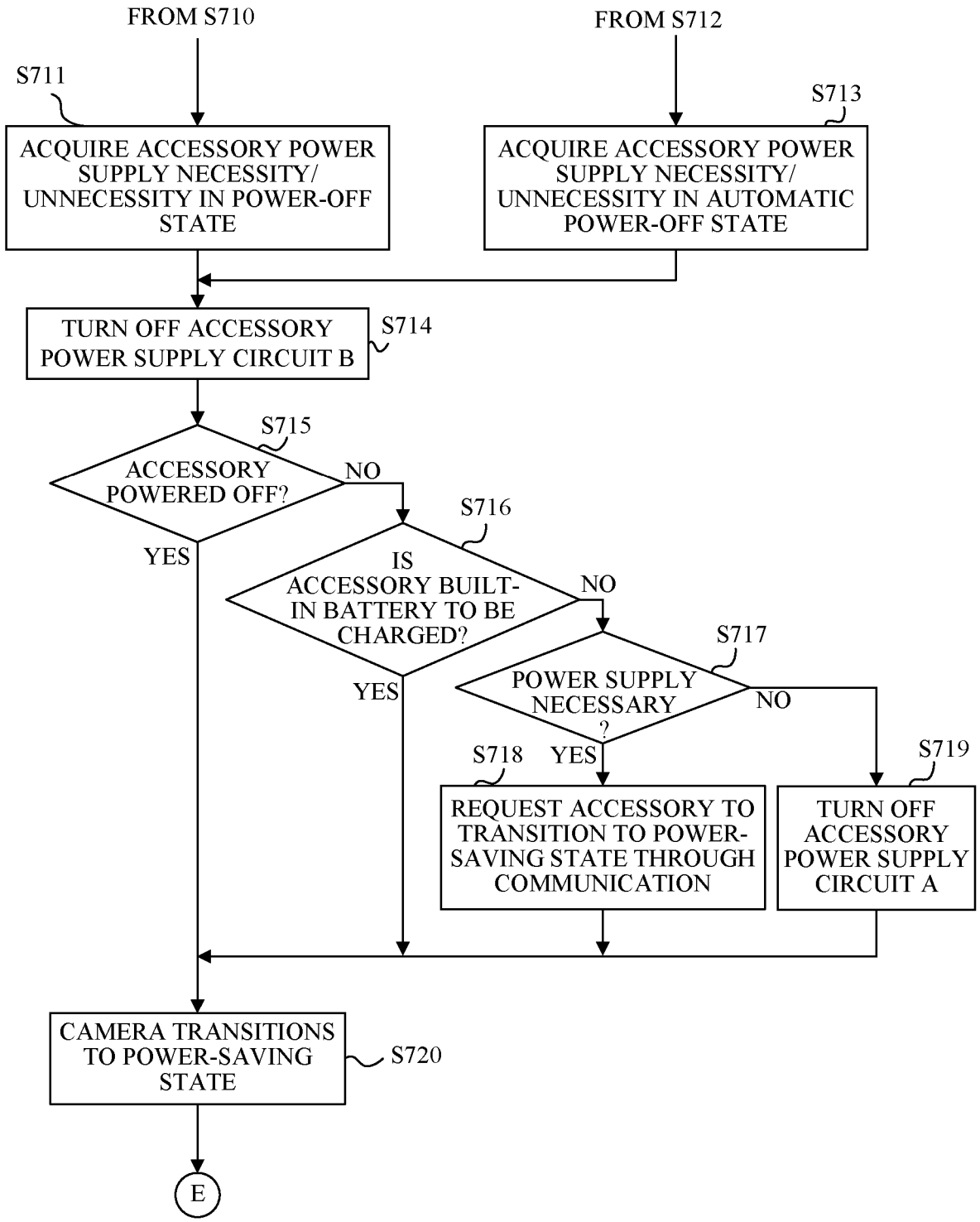

FIGS. 16A and 16B are a flowchart illustrating processing performed by the camera 100 when the camera 100 is started by changing an unillustrated power switch to a turning-on position or by operating an unillustrated operation member from an automatic power-off state described below. Each step in FIGS. 16A and 16B is executed by the camera 100 (mainly the camera control circuit A101 or the camera control circuit B102).

Initially, in step S700, the camera control circuit A101 of the camera 100 as a confirmation unit confirms the power supply state of the accessory power supply circuit A131. Here, the camera control circuit A101 can directly confirm it by reading a register of a power supply IC or by reading ae level of a power supply control IO, or confirm it using a value of a RAM or ROM that logically controls the power supply state. In the case where the accessory power supply circuit A131 is turned off, the flow proceeds to step S701, and the camera control circuit A101 turns on the accessory power supply circuit A131. On the other hand, in the case where the accessory power supply circuit A131 is turned on, step S701 is skipped and the flow proceeds to step S702.

In step S702, the camera 100 waits for the completion of the initial processing of the accessory 200. Next, in step S703, in response to the completion of the initial processing of the accessory 200, the camera 100 requests the accessory information, and acquires the information on the accessory 200 illustrated in FIG. 4.

Next, in step S704, the camera 100 reads out D7-0 (accessory type information) at the address 0x00 and D7-0 (accessory identification (ID) number) at the address 0x01 of the information acquired in step S703. Information on the accessory 200 connectable to the camera 100 is stored in an unillustrated ROM (memory) of the camera control circuit A101 or B102. The camera 100 compares the information stored in the ROM with the acquired type information on the accessory 200 and the ID information on the accessory 200. Then, the camera 100 determines whether the attached accessory 200 is an accessory compatible with the camera 100 (compatible accessory) or an accessory incompatible with the camera 100 (non-compatible accessory).

In the case where it is determined in step S704 that the accessory 200 is a non-compatible accessory, the flow proceeds to step S705, and the camera control circuit A101 turns off the accessory power supply circuit A131. Thereafter, the flow proceeds to step S706 to display on the display circuit 127 of the camera 100 that a non-compatible accessory is attached to the camera 100, and notify the user that the non-compatible accessory is attached to the camera 100. In this way, the display circuit 127 can display information on the power supply status from the accessory power supply circuit A131 or B132 to the accessory 200 (such as information indicating that the accessory 200 is a non-compatible accessory, etc.).

On the other hand, if it is determined in step S704 that the accessory 200 is a compatible accessory, the flow proceeds to step S707, and the camera 100 reads out D7-0 (required power) at the address 0x04 acquired in step S703. Thereafter, the power that can be output from the camera 100 (information on the power suppliable to the accessory 200) is read out of the unillustrated ROM (memory) of the camera control circuit A101 or B102, and compared with the required power (required by the accessory 200). In the case where the required power is larger than the power that can be output, the flow proceeds to steps S705 and S706, and similarly notifies the user that the accessory 200 is a non-compatible accessory (accessory 200 is inoperable). On the other hand, when the power that can be output is larger than the required power, the flow proceeds to step S708, and the camera control circuit A101 turns on the accessory power supply circuit B132.

Figure 18A:
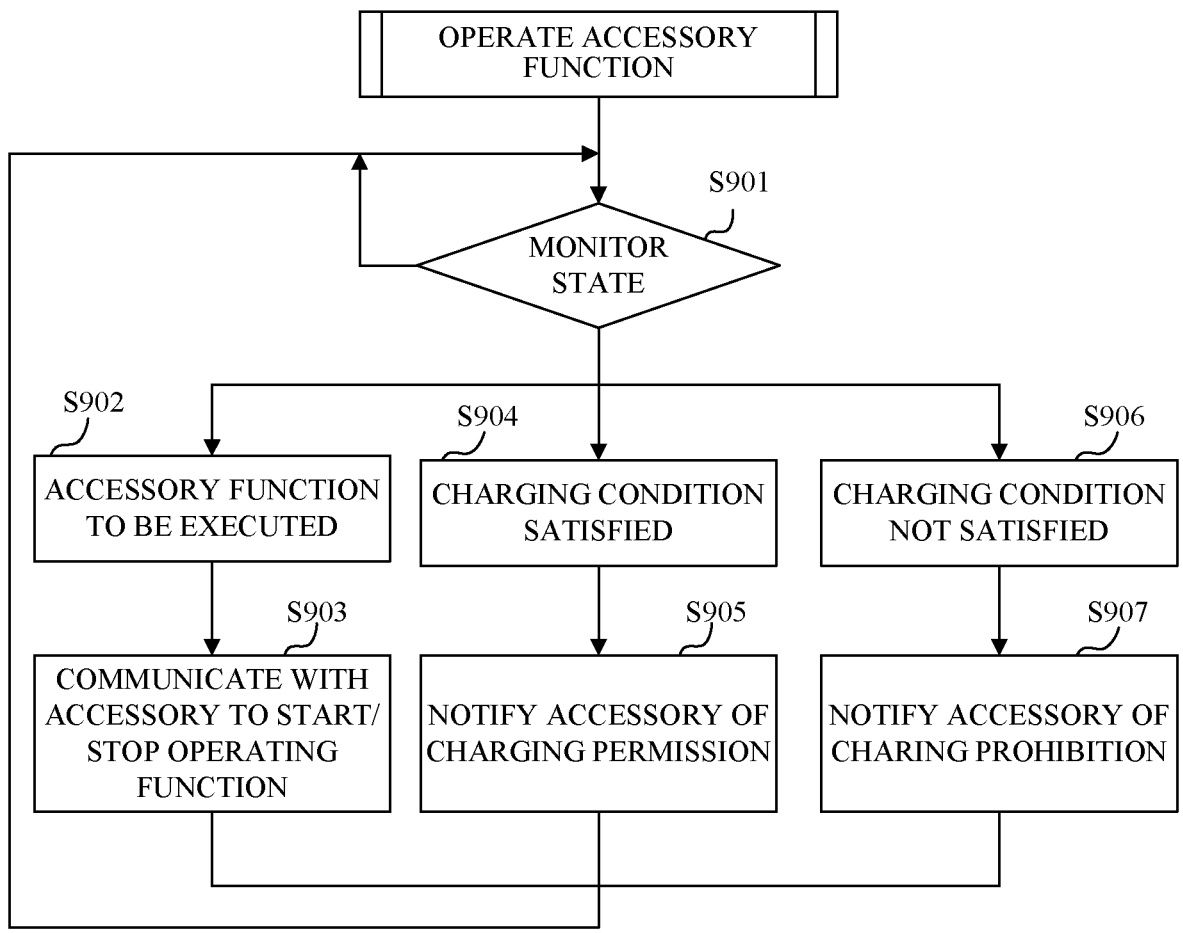
FIG. 18A illustrates communication to an accessory due to a change in the internal state of the camera according to the second to fourth embodiments.
Figure 18B:
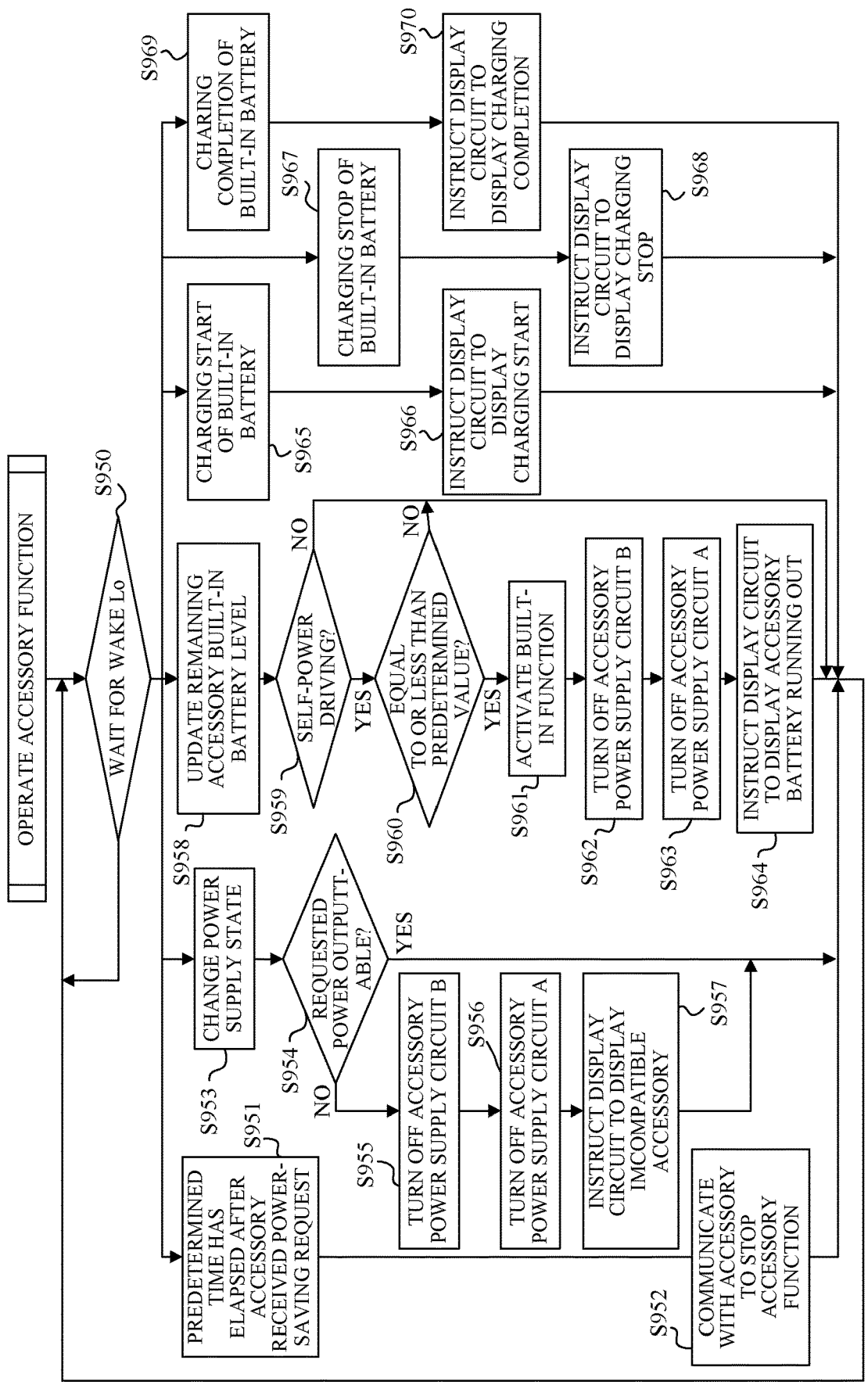
FIG. 18B illustrates WAKE reception processing by a camera according to the second to fourth embodiments.

By the above steps, the power supply processing to the accessory 200 is completed, and in step S709, the accessory function can become activated (the accessory 200 becomes operable) according to the camera operation. The details of step S709 are illustrated in FIGS. 18A and 18B, and will be described below.

In steps S710 and S712, the operation for terminating the camera 100 and the conditions are monitored. In step S710, the power button or power lever of the unillustrated camera 100 is operated to determine whether or not the operation for turning off the power is made. In the case where the operation for turning off the power has not been performed and the activated state of the camera 100 is continued, the flow proceeds to step S712.

In step S712, it is determined whether or not the camera 100 has not been operated for a predetermined time. The camera 100 has an auto-power off function when the non-operation state continues for a predetermined time or more in order to suppress power consumption. Hereinafter, this function will be referred to as automatic power-off. In the case where the non-operation state has not elapsed for a predetermined time in step S712, the activation state of the camera 100 is continued without turning off the power.

When the operation for turning off the power is made in step S710, the flow proceeds to step S711, and the camera 100 reads out D7-6 (energization when the power is turned off) at the address 0x03 of the information acquired in step S703. In the power-off state, the power is cut off in the subsequent step S718. It is therefore unnecessary to operate the camera 100 when the accessory 200 is detached from the camera 100, and it is unnecessary to specify an interrupt for attaching and detaching the accessory 200 as a factor for returning from the power saving state in step S720.

In the case where the camera has been in the non-operation state for the predetermined time or longer in step S712, the flow proceeds to step S713, and the camera 100 reads out D5-4 (energization during auto power off) at the address 0x03 of the information acquired in step S703.

Next, in step S714, the camera 1001 turns off the accessory power supply circuit B132. Next, in step S715, the camera 100 determines the energization state (electrification state) of the accessory 200. This determination is made because the energization may be cut off in step S709. If the power supply of the accessory 200 is energized, the flow proceeds to step S716.

In step S716, the camera 100 determines whether or not to charge the accessory built-in battery. This determination indicates that the item of D1-0 (charging compatibility) at the address 0x03 of the information acquired in step S703 corresponds to charging. Step S904 of FIG. 18A is executed by the camera 100, and in the case where the camera 100 is in a rechargeable state, the flow proceeds to step S719. In this embodiment, step S904 is controlled so that it is satisfied when the use power of the camera 100 is equal to or less than a predetermined value. The condition of step S904 is not limited to this example, and it may always be satisfied and charging may be made with surplus power. Alternatively, it may be determined to be satisfied on condition that the function of the camera 100 is restricted and the output from the battery 111 is secured. The accessory power supply circuit B132 may be controlled to be turned on if this configuration is necessary for the circuit configuration during charging. The charging of the accessory will be described in detail in the fourth embodiment. In the case where it is determined in step S716 that the accessory built-in battery is not to be charged, the flow proceeds to step S717.

In step S717, it is determined whether or not energization is necessary using the accessory energization necessity determination acquired in step S711 or S713, and if so the flow proceeds to step S718 to notify the accessory 200 of a transition to the power saving state. In the case where it is determined in step S717 that no energization is necessary for the accessory 200, the flow proceeds to step S719 to turn off the accessory power supply circuit A131. Next, in step S720, both the camera control circuits A101 and B102 are transitioned to the power saving states.

Figure 17A:
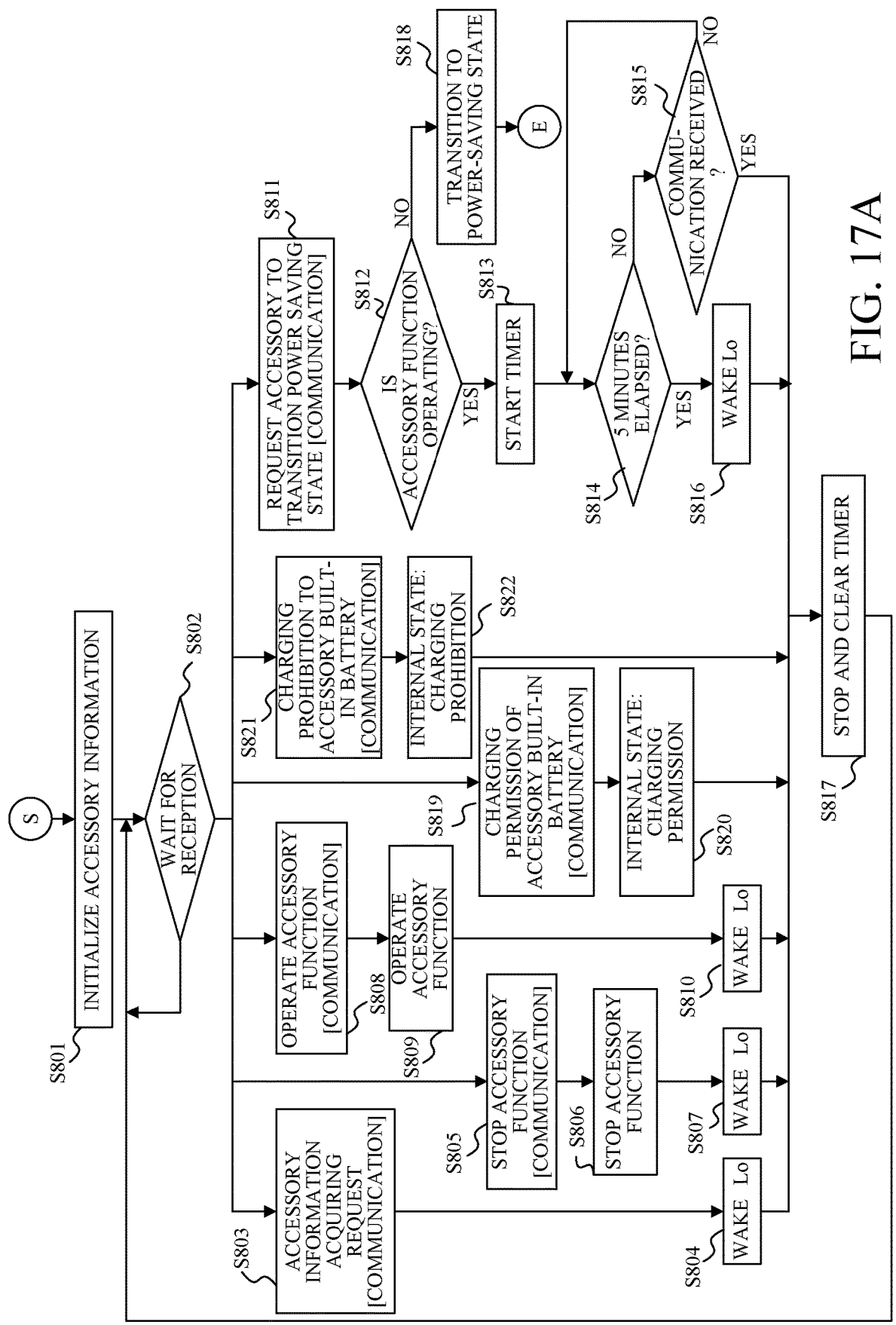
FIG. 17A illustrates communication reception processing by an accessory according to the second to fourth embodiments.
Figure 17B:
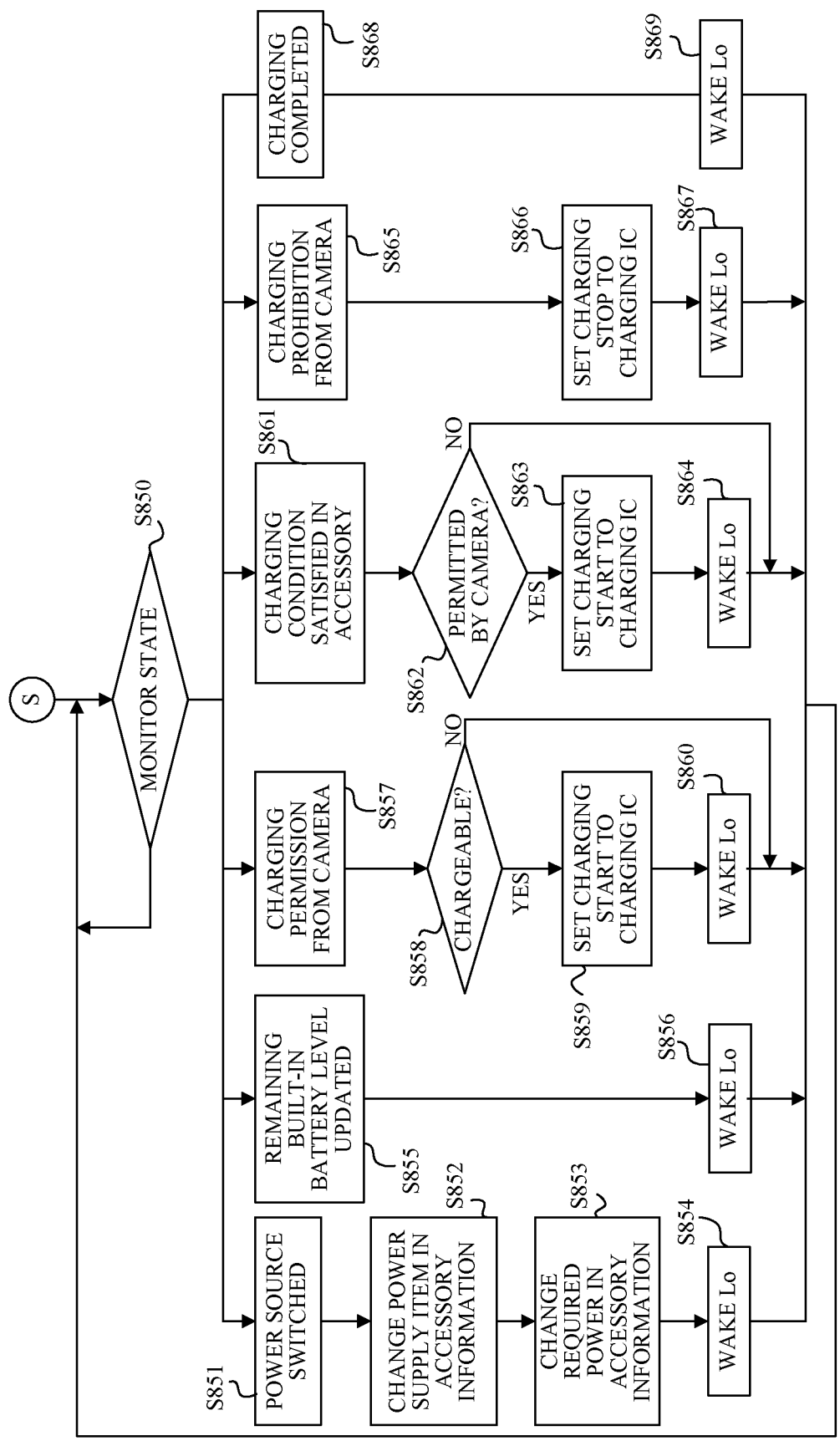
FIG. 17B illustrates processing associated with a change in an internal state of the accessory according to the second to fourth embodiments.

FIG. 17A is a flowchart illustrating processing when a communication is received from the camera 100 as accessory-side processing. FIG. 17B is a flowchart illustrating processing associated with a change in the internal state as the accessory-side processing. Each step in FIGS. 17A and 17B is performed by the accessory 200 (mainly the accessory control circuit 201).

The flowchart in FIGS. 16A and 16B will be described from the viewpoint of the accessory 200. When the accessory power supply circuit A131 is turned on in step S701, the accessory 200 is started and flowcharts of FIGS. 17A and 17B are started. Then, step S801 is performed to set the accessory information illustrated in FIG. 4, and next step S802 waits for communication reception. Step S850 starts monitoring a change in the internal state.

When the accessory information is requested in step S703, the flow passes through step S802, this request is determined to be communication in step S803, and the flow proceeds to step S804. In step S804, the information illustrated in FIG. 4 is properly updated, and the camera 100 is notified by WAKE. The camera 100 receives WAKE in step S702 and reads out the information in step S703.

When the accessory power supply circuit A131 is turned off in step S705, the power supply to the accessory 200 is cut off, so that the accessory control circuit 201 is stopped.

When the accessory power supply circuit B132 is turned on in step S708, the power required for the accessory 200 is supplied, and the function for each accessory, such as a strobe, GPS, or a microphone, is activated.

FIG. 18A illustrates the details of step S709. In the case where step S902 is satisfied, the camera 100 communicates with the accessory 200 to instruct the accessory 200 to execute the function of the accessory 200, such as a strobe, GPS, or microphone function in step S903. In response, it is determined in steps S805 and S808 that the accessory function is stopped or operated. In the case where the accessory function is operated, the accessory function is executed in step S809, and the fact is notified as WAKE in step S810. For example, in the case of the strobe, a light emission is applicable. In the case where the accessory function is stopped, the accessory function is stopped in step S806, and the fact is notified as WAKE in step S807.

When the accessory is notified of the transition request to the power saving state in step S718, it is determined that the accessory 200 has received the power saving request in step S811. It is determined whether or not the accessory function is operating in step S812. For example, in the case of the strobe, it means a state in which light emission is ready, and in the case of GPS, it means a state in which position information is periodically acquired.

If it is determined in step S812 that the accessory is operating, the flow proceeds to step S813 to start the timer. The timer is intended to transition the accessory to the power saving state when the timer completes measuring time. The accessory continues to operate until the timer completes measuring time, and if there is an operation, a state that can activate the function corresponding to the operation is maintained, and after the timer completes measuring time, the state shifts to the power saving state.

Since the timer is set to 5 minutes in this embodiment, the accessory 200 waits for measuring 5 minutes in step S814. In the case where communication occurs during waiting, the flow passes through step S815 for waiting for the time measurement and the timer is cleared in step S817 to stop the timer. Thereafter, any of steps S803, S805, S809, S819, S812, and S811 is performed according to the content of the communication.

If 5 minutes are measured without receiving communication, the flow proceeds to step S815, and the camera 100 is notified of a completion of the five-minute measurement by WAKE. At this point, the camera 100 is in the power saving state of step S720, but it wakes up due to WAKE as a trigger and executes the flow of FIGS. 16A and 16B from the start. The camera 100 continues processing up to step S709 and receives WAKE generated in step S815 in step S950 illustrated in FIG. 18B. Then, the flow proceeds to step S951. The next processing stops the function of the accessory in step S952.

In response to step S952, the accessory 200 determines that communication is received in step S802, determines that the accessory function is stopped in step S805, and stops the accessory function in step S806. If necessary, WAKE is notified in step S807.

After WAKE is determined in step S709 and the accessory function is stopped, the processing continues up to steps S714 and S715, and the accessory is notified of the power saving request in step S718. This notification is determined by the accessory control circuit 201 in step S811, and since the accessory function is stopped, the flow transitions to step S818 after step S812, and the accessory transitions to the power saving state. Thereafter, the camera 100 also transitions to the power saving state in step S720.

As described above, according to the flowchart of FIGS. 16A and 16B, the accessory power supply circuit A131 of the accessory 200 is continuously turned on during automatic power-off, and it is unnecessary to turn on the accessory power supply circuit A131 at the next startup.

The image pickup apparatus (camera 100) according to this embodiment includes a power supply unit (accessory power supply circuit A131, accessory power supply circuit B132) and control unit (camera control circuit A101, camera control circuit B102). The power supply unit can supply the accessory 200 with a first power and a second power larger than the first power. The control unit stores information on the power suppliable to the accessory and controls the power supply unit. The control unit controls the power supplied from the power supply unit to the accessory based on the information on the power suppliable to the accessory and information on the power required by the accessory acquired from the accessory. The control unit may determine whether or not the accessory is attached to the image pickup apparatus. The power supply unit supplies a first power to the accessory in the case where it is determined that the accessory is attached to the image pickup apparatus. Also, the power supply unit may supply a second power to the accessory in the case where the power suppliable to the accessory is larger than the power required by the accessory. On the other hand, in the case where the power suppliable to the accessory is smaller than the power required by the accessory, the control unit stops supplying the first power and the second power to the accessory. Therefore, this embodiment can provide an image pickup apparatus and an accessory, each of which can provide efficient power consumption.

Third Embodiment

Next follows a description of a third embodiment according to the present invention. In the case where the accessory 200 has a built-in battery, the accessory 200 can be driven by the battery, which will be called self-power. On the other hand, in the case where the accessory 200 has no built-in battery, the accessory 200 is driven by the power supplied from the camera 100, which will be called bus power.

Whether the driving source (power source) of the accessory 200 connected (attached) to the camera 100 is the built-in battery or the power supply from the camera 100 is indicated by D3-2 (power supply specification) at the address 0x03 in FIG. 4. During self-power (in the case where the drive source is the built-in battery of the accessory 200), the required power to the camera 100 is small. On the other hand, during bus power (in the case where the drive source is the power supplied from the camera 100), the required power to the camera 100 is large. In addition, since the battery may run out during self-power, it is necessary to acquire the remaining battery level and to secure control in the case where the remaining battery level falls below a predetermined value.

The self-power and bus power can be switched, for example, by operating the lever or push button attached to the accessory 200. Alternatively, they may be switched by communication from the camera 100, or the condition, for example, of whether a measured temperature of the accessory 200 becomes a predetermined temperature or higher or lower. The control in this embodiment sets the bus power when the power supply switch 203 is located at the ON (turning-on) position, and the self-power when the power supply switch 203 is located at the OFF (turning-off) position. The start processing and the end processing are performed according to the flowchart in FIGS. 16A and 16B, regardless of whether self-power or bus power is used. A difference between the two controls is illustrated in step S709.

A description will be given of an ongoing operation with bus power. In the case where the user operates the power supply switch 203 during bus-power driving, a change in the power supply switch 203 is detected in step S851 through status monitoring in step S850. Since the position of the power supply switch 203 has been changed to the OFF position (indicating self-power), a setting for self-power is made and the accessory 200 starts driving with the battery (built-in battery) 205.

Next, in step S852, the item indicated by D3-2 (power supply specification) at the address 0x03 in FIG. 4 is changed to self-power. Next, in step S853, the item illustrated in D7-0 (required power) at the address 0x04 in FIG. 4 is changed to the power required for self-powering. Next, in step S854, WAKE is generated to notify the camera 100 of the change. WAKE is detected by the camera 100 in step S950.

In step S953, the factor of WAKE is read out and the change in the power supply state is acquired. Similar to step S703, the accessory information is requested and the information on the accessory 200 illustrated in FIG. 4 is acquired. Next, it is determined in step S954 whether or not the camera 100 can output the required power about the information acquired in step S953, similar to step S704. When it is determined that the camera 100 cannot output the required power, the accessory power supply circuit B132 is turned off in step S955. Next, in step S956, the accessory power supply circuit A131 is turned off. Next, in step S957, similarly to step S706, the user is notified that the accessory 200 is a non-compatible accessory. On the other hand, when it is determined in step S954 that the camera 100 can output the required power, the energization state is continued.

A description will be given of the ongoing operation with self-power. During self-power driving, the accessory control circuit 201 periodically acquires the remaining battery level of the battery 205. A change in the remaining battery level is detected by the state monitoring in step S850, the flow proceeds to step S855, and the camera 100 is notified by WAKE in step S856. WAKE in step S856 is detected in step S950 of the camera 100, and the flow proceeds to step S958.

The camera control circuit A 101 that has detected the low level of WAKE in step S950 updates the remaining battery level in the accessory 200 from the accessory information in step S958. In step S959, the item indicated by D3-2 (power supply specification) at the address 0x03 in FIG. 4 that has been previously read is referred to, and the processing ends if the bus power is shown. If the self-power is shown, the flow proceeds to step S960.

It is determined in step S960 whether or not the remaining battery level is equal to or less than a predetermined value. This value is an arbitrary value and may be 0% or a value other than 0%. This value may be dynamically changed according to the operation state of the camera 100. In the case where the remaining battery level is equal to or less than the predetermined value, the flow proceeds to step S961. On the other hand, in the case where the remaining battery level is larger than the predetermined value, this processing ends.

For example, in the case where the accessory 200 connected to the camera 100 is a microphone, the camera 100 may have an unillustrated built-in microphone. In the case where the battery level of the accessory 200 is less than the predetermined value and it is difficult to continue the function, the accessory 200 may be switched to the built-in microphone. Step S961 relates to activation processing of the built-in function. In the case where there is no built-in function, or in the case where the built-in function exists but switching is unnecessary depending on the remaining battery level, this step may be omitted. Thereafter, the camera control circuit A 101 performs control for turning off the accessory power supply circuit B 132 in step S962, and performs control for turning off the accessory power supply circuit A 131 in step S963. The camera control circuit A 101 instructs the display circuit 127 to display that the battery of the accessory 200 has run out in step S964.

In steps S955 and S956, the accessory power supplies are turned off. Then, in step S957, the display circuit 127 displays that the battery of the accessory 200 has run out.

Fourth Embodiment

Next follows a description of a fourth embodiment according to the present invention. When the accessory 200 has a built-in battery, the accessory 200 can charge the built-in battery by using the power supplied from the camera 100. In this embodiment, the camera 100 determines whether to charge the built-in battery. This is to stably supply the charging current but is not an essential configuration. The accessory control circuit 201 may separate the charging power and the feeding power within a range of the required power of the accessory 200.

A description will be given of a start of charging the built-in battery. In the case where the charging start condition is satisfied in the state monitoring step S901 of the camera 100, the flow proceeds to step S904. The charging condition may be such a condition based on an operation state (operation mode) that a USB is connected to the camera 100 and a power source can be secured, or that the camera 100 is transitioned to the power saving state and a charging current can be stably supplied. If any functions of the camera 100 cannot be realized during charging, the deactivation of that function may be set as a charging start condition. Alternatively, charging may be available at all times without any conditions. If chargeability is determined, the camera 100 notifies the accessory 200 of a charging permission in step S905. The accessory 200 receives in step S802 the charge availability determination notified in step S905, and the flow proceeds to step S819 because it is a notification of the charging permission. Following step S819, the flow proceeds to step S820, and the internal state is set as the charging permission.

In response to the charging permission in step S820, the flow proceeds to charging permission processing step S857 through the status monitoring in step S850. In case of chargeability (S858) as the state of the accessory 200, the flow proceeds to step S859, the charging circuit 204 is controlled, and the camera 100 is notified by WAKE that charging has started in step S860. If it is determined in step S858 that charging is not possible, the processing ends. The charging availability determination in step S858 may use, for example, an authentication result of the battery or the temperature of the accessory 200. Alternatively, charging may always be permitted without setting any conditions. If it is determined in step S861 that the charging condition of the accessory 200 is satisfied, it is determined in step S862 whether or not the camera control circuit A101 has notified the charging permission. In the case where the charging permission is notified, the charging circuit 204 is controlled in step S863, and WAKE is set to a low level in order to notify the camera 100 that charging has started in step S864.

In response to WAKE generated in step S860, the camera 100 detects WAKE in step S950 and acquires its factor, and the flow proceeds to step S965. The flow proceeds to step S966, and the display circuit 127 of the camera 100 displays that charging has started.

A description will be given of a charging stop. If the charging stop is established in the state monitoring step S901 of the camera 100, the flow proceeds to step S906. The charging stop condition may be such a condition that the USB connected to the camera 100 is disconnected, or that the power consumption of the camera 100 becomes large. If any functions of the camera 100 cannot be realized during charging, the activation of that function may be set as the charging stop condition. If it is determined that charging is unavailable, the camera 100 notifies the accessory 200 of a charging prohibition in step S907.

The accessory 200 receives in step S802 the charge prohibition determination notified in step S907, and the flow proceeds to step S821 because it is the charging prohibition notification. Following step S821, the flow proceeds to step S822 to set the internal state the charging prohibition.

In response to the charging prohibition in step S822, the flow proceeds to charging prohibition processing step S865 through the state monitoring in step S850. The charging circuit 204 is controlled in step S866 to stop charging. In step S867, WAKE notifies the camera 100 that charging has been stopped.

In response to WAKE generated in step S867, the camera 100 detects WAKE in the processing step S950 and acquires its factor, and the flow proceeds to step S967. The flow proceeds to step S968, and the display circuit 127 of the camera 100 displays that charging has been stopped.

A description will be given of a charging completion. When a satisfaction of the charging completion condition for the accessory 200 that is being charged is detected in the state monitoring step S850 of the accessory 200, the flow proceeds to step S868, and WAKE is generated in step S869 to notify the camera 100.

In response to WAKE generated in step S869, the camera 100 detects WAKE in step S950 and acquires its factor, and the flow proceeds to step S969. The flow proceeds to step S970, and the display circuit 127 of the camera 100 displays the charging completion.

Thus, in this embodiment, the control unit (camera control circuit) determines whether or not it is possible to supply a predetermined amount or more of power from the power supply unit (accessory power supply circuit) to the accessory 200. For example, the control unit determines whether or not it is possible to supply the predetermined amount or more of the power based on the operation state (operation mode) of the image pickup apparatus. In the case where the control unit determines that it is possible to supply the predetermined amount or more of the power, the control unit may notify the accessory of information on a use permission of the predetermined amount or more of the power. In addition, the control unit may acquire information on charge control of a battery in the accessory from the accessory. Then, in the case where it is possible to supply the predetermined amount or more of the power from the power supply unit to the accessory, the control unit determines whether or not to charge the battery in the accessory based on the information on the charge control.

In the above embodiment, the accessory 200 is mainly directly attached to the camera 100 but other forms may be applicable. For example, the camera 100 and a main accessory corresponding to the accessory 200 may communicate with each other via an intermediate accessory such as an adapter device connected to the camera 100 and the main accessory. In this embodiment, the intermediate accessory may execute communication control corresponding to at least part of the communication control executed by the accessory 200 and the communication control executed by the camera 100 described in the above embodiment. Alternatively, the intermediate accessory may serve as an information transmission path such that the accessory outputs information corresponding to information input from the camera 100 to the main accessory and information corresponding to information input from the main accessory to the camera 100. Thus, the accessory referred to in the present invention includes various accessories such as a microphone device, a lighting device, and an adapter device. An adapter device can also be included in electronic apparatus.

In each embodiment, the image pickup apparatus (camera 100) includes the control unit (camera control circuit A101, camera control circuit B102) communicable with the accessory 200. The control unit stores information on the power suppliable to the accessory. The control unit acquires at least one of information on the power required by the accessory, information on the power source for the accessory, or information on the charge control of the battery provided in the accessory from the accessory. In each embodiment, the accessory 200 includes the control unit (accessory control circuit 201) communicable with the image pickup apparatus. The control unit is supplied with power from the image pickup apparatus, and transmits accessory type information according to a request from the image pickup apparatus. The control unit transmits at least one of information on the power required by the accessory, information on the power source for the accessory, or information on the charge control of the battery in the accessory to the image pickup apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Each embodiment can provide an image pickup apparatus, an accessory, a control method for the image pickup apparatus, a control method for the accessory, and a storage medium, each of which can provide efficient power consumption.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-096340, filed on Jun. 9, 2021, which is hereby incorporated by reference herein in its entirety.

What is claimed is:

1. An image pickup apparatus to which an accessory is attachable, the image pickup apparatus comprising:
at least one processor; and
at least one memory coupled to the at least one processor storing instructions that, when executed by the at least one processor, cause the at least one processor to function as a control unit communicable with the accessory,
wherein the control unit stores information on power suppliable to the accessory, and
wherein the control unit acquires from the accessory at least one of information on the power required by the accessory, information on a power source for the accessory, and information on charge control of a battery provided in the accessory,
wherein the control unit
determines whether or not the accessory is operable based on type information on the accessory acquired from an attached accessory, and
supplies the second power to the accessory in a case where the accessory is operable, and
stops supplying the first power and the second power to the accessory in a case where the accessory is not operable.

2. An image pickup apparatus to which an accessory is attachable, the image pickup apparatus comprising:
- a power supply unit configured to supply a first power and a second power larger than the first power to the accessory;
- at least one processor; and
- at least one memory coupled to the at least one processor storing instructions that, when executed by the at least one processor, cause the at least one processor to function as a control unit configured to store information on power suppliable to the accessory and to control the power supply unit,
- wherein the control unit controls the power supplied from the power supply unit to the accessory based on the information on the power suppliable to the accessory and information on the power required by the accessory acquired from the accessory, and
- wherein the control unit:
  - determines whether or not the accessory is operable based on type information on the accessory acquired from an attached accessory, and
  - supplies the second power to the accessory in a case where the accessory is operable, and
  - stops supplying the first power and the second power to the accessory in a case where the accessory is not operable.

3. The image pickup apparatus according to claim 2, wherein the control unit determines whether or not the accessory has been attached to the image pickup apparatus, and
- wherein the power supply unit supplies the first power to the accessory in a case where it is determined that the accessory has been attached to the image pickup apparatus.

4. The image pickup apparatus according to claim 2, wherein the power supply unit
- supplies the second power to the accessory in a case where the power suppliable to the accessory is larger than the power required by the accessory, and
- stops supplying the first power and the second power to the accessory in a case where the power suppliable to the accessory is smaller than the power required by the accessory.

5. The image pickup apparatus according to claim 4, wherein the control unit determines that an attached accessory is not operable in the case where the power suppliable to the accessory is smaller than the power required by the accessory.

6. The image pickup apparatus according to claim 2, further comprising a display unit configured to display information on a power supply status from the power supply unit to the accessory.

7. The image pickup apparatus according to claim 2, wherein the control unit determines whether or not it is possible to supply a predetermined amount or more of the power from the power supply unit to the accessory.

8. The image pickup apparatus according to claim 7, wherein the control unit determines whether or not it is possible to supply the predetermined amount or more of the power based on an operation state of the image pickup apparatus.

9. The image pickup apparatus according to claim 7, wherein in a case where the control unit has determined that it is possible to supply the predetermined amount or more of the power, the control unit notifies the accessory of information on a use permission of the predetermined amount or more of the power.

10. The image pickup apparatus according to claim 7, wherein the control unit
- acquires information on charge control of a battery in the accessory from the accessory, and
- determines whether or not to charge the battery in the accessory based on the information on the charge control in a case where it is possible to supply the predetermined amount or more of the power from the power supply unit to the accessory.

11. The image pickup apparatus according to claim 2, wherein the control unit determines whether or not charge control of a battery in the accessory is possible based on a state of the image pickup apparatus.

12. The image pickup apparatus according to claim 2, wherein in a case where a power source for the accessory is a battery in the accessory, the control unit changes control of the image pickup apparatus based on a remaining amount of the battery.

13. The image pickup apparatus according to claim 12, wherein changing the control of the image pickup apparatus is at least one of switching an operation of the accessory to an operation based on power supply from the image pickup apparatus, stopping controlling the accessory, and changing a functional operation of the image pickup apparatus.

14. An accessory attachable to an image pickup apparatus, the accessory comprising:
- at least one processor; and
- at least one memory coupled to the at least one processor storing instructions that, when executed by the at least one processor, cause the at least one processor to function as a control unit communicable with the image pickup apparatus; and
- a battery as a power source for the accessory,
- wherein the control unit is supplied with power from the image pickup apparatus, and transmits type information on the accessory in accordance with a request from the image pickup apparatus, and
- wherein the control unit transmits to the image pickup apparatus at least one of information on the power required by the accessory, information on the power source for the accessory, and information on charge control of the battery in the accessory,
- wherein the control unit can switch whether or not to use the battery as the power source for the accessory, and
- wherein the power required for the accessory when the battery is used is smaller than the power required for the accessory in a case where the battery is not used.

15. The accessory according to claim 14, wherein in a case where the battery is used as the power source for the accessory, the control unit transmits information on a remaining amount of the battery to the image pickup apparatus.

16. The accessory according to claim 14, wherein the control unit receives a signal indicating that it is possible to supply a predetermined amount or more of the power from the image pickup apparatus, and then starts an operation that needs the predetermined amount or more of the power.

17. The accessory according to claim 14, wherein the information on the charge control to the battery is information on whether or not the charge control is possible, and
- wherein the control unit transmits the information on whether or not the charge control is possible to the image pickup apparatus.

18. The accessory according to claim 14, wherein the control unit starts the charge control after receiving a notification from the image pickup apparatus indicating that the charge control is possible.

19. A control method of an image pickup apparatus to which an accessory is attachable, the control method comprising the steps of:
- acquiring information on power suppliable to the accessory from a memory;
- acquiring from the accessory at least one of information on the power required by the accessory, information on a power source for the accessory, and information on charge control of a battery in the accessory;
- determining whether or not the accessory is operable based on type information on the accessory acquired from an attached accessory;
- supplying the second power to the accessory in a case where the accessory is operable; and
- stopping supplying the first power and the second power to the accessory in a case where the accessory is not operable.

20. A non-transitory computer-readable storage medium storing a program that causes a computer to execute the control method according to claim 19.

21. A control method of an image pickup apparatus to which an accessory is attached, the control method comprising the steps of:
- acquiring information on power suppliable to the accessory from a memory of the image pickup apparatus;
- acquiring information on the power required by the accessory from the accessory; and
- controlling the power supplied from the image pickup apparatus to the accessory based on the information on the power suppliable to the accessory and the information on the power required by the accessory;
- determining whether or not the accessory is operable based on type information on the accessory acquired from an attached accessory;
- supplying the second power to the accessory in a case where the accessory is operable; and
- stopping supplying the first power and the second power to the accessory in a case where the accessory is not operable.

22. A control method of an accessory attachable to an image pickup apparatus and suppliable with power from the image pickup apparatus, the control method comprising the steps of:
- transmitting type information on the accessory in accordance with a request from the image pickup apparatus;
- transmitting to the image pickup apparatus at least one of information on the power required by the accessory, information on a power source for the accessory, and information on charge control of a battery in the accessory; and
- switching whether or not to use the battery as the power source for the accessory,
- wherein the power required for the accessory when the battery is used is smaller than the power required for the accessory in a case where the battery is not used.

* * * * *